US009589203B2

(12) United States Patent
Mukherjee et al.

(10) Patent No.: US 9,589,203 B2
(45) Date of Patent: Mar. 7, 2017

(54) ACTION BASED ACTIVITY DETERMINATION SYSTEM AND METHOD

(71) Applicant: TATA CONSULTANCY SERVICES LIMITED, Mumbai (IN)

(72) Inventors: Dipti Prasad Mukherjee, Kolkata (IN); Tamal Batabyal, Charlottesville, VA (US); Tanushyam Chattopadhyay, Kolkata (IN)

(73) Assignee: TATA Consultancy Services Limited, Mumbai, MH (IN)

( * ) Notice: Subject to any disclaimer, the term of this patent is extended or adjusted under 35 U.S.C. 154(b) by 0 days.

(21) Appl. No.: 14/665,345

(22) Filed: Mar. 23, 2015

(65) Prior Publication Data

US 2015/0269744 A1 Sep. 24, 2015

(30) Foreign Application Priority Data

Mar. 24, 2014 (IN) ........................... 986/MUM/2014
Jun. 16, 2014 (IN) .......................... 1944/MUM/2014

(51) Int. Cl.
*G06K 9/00* (2006.01)
*G06K 9/44* (2006.01)
*G06F 3/01* (2006.01)
*G06K 9/46* (2006.01)

(52) U.S. Cl.
CPC ................ *G06K 9/44* (2013.01); *G06F 3/011* (2013.01); *G06K 9/00342* (2013.01); *G06K 9/4685* (2013.01)

(58) Field of Classification Search
CPC ........... G06K 9/00342; G06K 9/00355; G06K 9/00335; G06F 3/017; G06F 3/011; G06F 2203/04808
See application file for complete search history.

(56) References Cited

U.S. PATENT DOCUMENTS

| 5,644,656 | A | * | 7/1997 | Akra | G06K 9/6206 382/195 |
| 7,295,975 | B1 | * | 11/2007 | Bangalore | G06K 9/00355 382/187 |
| 8,526,767 | B2 | * | 9/2013 | Bowens | G06F 3/03547 345/173 |
| 2011/0199291 | A1 | * | 8/2011 | Tossell | G06F 3/017 345/156 |

(Continued)

*Primary Examiner* — Gandhi Thirugnanam
(74) *Attorney, Agent, or Firm* — Workman Nydegger

(57) ABSTRACT

A processor implemented system and method for identification of an activity performed by a subject based on sensor data analysis is described herein. In an implementation, the method includes capturing movements of the subject in real-time using a sensing device. At least one action associated with the subject is ascertained from a predefined set of actions. From the predefined set of actions, a plurality of actions can collectively form at least one activity. The ascertaining is based on captured movements of the subject and at least one predefined action rule. The at least one action rule is based on context-free grammar (CFG) and is indicative of a sequence of actions for occurrence of the at least one activity. Further, a current activity performed by the subject is dynamically determined, based on the at least one action and an immediately preceding activity, using a non-deterministic push-down automata (NPDA) state machine.

18 Claims, 4 Drawing Sheets

(56) References Cited

U.S. PATENT DOCUMENTS

| | | | |
|---|---|---|---|
| 2012/0093360 A1* | 4/2012 | Subramanian | G06K 9/00201 382/103 |
| 2012/0225719 A1* | 9/2012 | Nowozin | G06K 9/00342 463/36 |
| 2012/0327194 A1* | 12/2012 | Shiratori | G06F 3/011 348/47 |
| 2013/0182890 A1* | 7/2013 | Shehata | G06T 7/0008 382/103 |
| 2014/0147035 A1* | 5/2014 | Ding | G06F 3/017 382/164 |
| 2014/0169623 A1* | 6/2014 | Liu | G06K 9/00342 382/103 |
| 2014/0321750 A1* | 10/2014 | Nouri | G06K 9/00335 382/187 |
| 2015/0131896 A1* | 5/2015 | Hu | G06K 9/00355 382/153 |
| 2015/0161437 A1* | 6/2015 | Mazurenko | G06K 9/00389 382/103 |
| 2015/0269744 A1* | 9/2015 | Mukherjee | G06K 9/44 382/103 |
| 2016/0267142 A1* | 9/2016 | Cafarella | G06F 17/30495 |

\* cited by examiner

ACTION BASED ACTIVITY DETERMINATION SYSTEM AND METHOD

CROSS-REFERENCE TO RELATED APPLICATIONS AND PRIORITY

The present application claims priority to and benefit of Indian patent application No. 986/MUM/2014 filed on Mar. 24, 2014 and Indian patent application no. 1944/MUM/2014 filed on Jun. 16, 2014. All of the aforementioned applications are incorporated herein by reference in their entirety.

TECHNICAL FIELD

The embodiments herein generally relate to sensor data analysis, and, more particularly, to an identification system and method for identifying an action and determining an activity based on the action using sensor data analysis.

DESCRIPTION OF THE RELATED ART

Human activity identification is conventionally done from a sequence of image frames, say in a video, to automatically analyze ongoing activities. Nowadays, human activity identification finds prolific usage in various applications, for example, in automated surveillance systems in public places for detecting suspicious activities, or in hospitals and other institutions for monitoring of patients, children, and elderly subjects. Conventional activity recognition system can recognize various types of human movements at different levels, including elementary level movements, such as gestures, intermediate level movements, such as actions, and high level activities that are formed as a combination of various gestures and actions.

In recent years, the importance of automatic identification of actions performed by humans has increased. Examples of the actions include high arm wave, horizontal arm wave, hand catch, side boxing, golf swing, and side kick. The automatic identification of actions has recently been demonstrated to be very useful in a wide range of applications including automatic surveillance, for example in shopping malls and railway stations, tele monitoring of patients and elderly people, and interactive applications, for example in human-computer interaction. For instance, a common problem with the elderly people is injuries caused by falls. Most of the fall incidents are caused by tripping or bumping into objects. In order to provide immediate assistance to the elderly people, their activities or actions can be monitored and communicated to their doctors and caretakers.

SUMMARY

In one aspect a method for identification of an activity performed by a subject is provided. The method comprising: capturing movements of the subject in real-time using a sensing device, wherein the movements comprises n skeleton frames of the subject, and wherein each of the n skeleton frames represents data of N skeleton joints of the subject; ascertaining, by a processor, at least one action associated with the subject from a predefined set of actions, a plurality of actions from the predefined set of actions collectively forming at least one activity, wherein the ascertaining is based on captured movements of the subject and at least one predefined action rule, the at least one predefined action rule being based on context-free grammar (CFG) and being indicative of a sequence of actions for occurrence of the at least one activity; and determining, dynamically, by the processor, a current activity performed by the subject, based on the at least one action and an immediately preceding activity, using a non-deterministic push-down automata (NPDA) state machine.

Ascertaining, by the processor, the at least one action comprises: computing, by the processor, a covariance matrix of a feature matrix for the at least one action, wherein the feature matrix is based on joint coordinates of the N skeleton joints from each of the n skeleton frames for the action; identifying, by the processor, an error covariance matrix for the at least one action based on value of n, value of N, and value of variance of the joint coordinates of one of the N skeleton joints, wherein the error covariance matrix relates to noise present in the joint coordinates of the N skeleton joints of the subject; evaluating, by the processor, a noise-free covariance matrix for the at least one action based on the covariance matrix and the error covariance matrix; determining, by the processor, an active joint matrix for the at least one action based on an active joint threshold and the noise-free covariance matrix, wherein the active joint matrix represents a plurality of most active joint coordinates that uniquely identifies the at least one action; and identifying, by the processor, the at least one action, from amongst the plurality of known actions, based on the active joint matrix. The current activity is determined based on a state of a stack of the NPDA state machine, and wherein the determining the current activity comprises ascertaining whether the current activity is different from the immediately preceding activity, based on the state of the stack of the NPDA state machine. The method further comprises obtaining at least one predefined category of activities indicative of activities identifiable based on the at least one action alone; ascertaining, by the processor, whether the current activity falls within the at least one category of activities; and providing, by the processor, an identification parameter associated with the current activity to the NPDA state machine for populating a stack of the NPDA state machine, based on the ascertaining, wherein the identification parameter comprises at least one of a timestamp associated with the current activity, a height of the subject, a covariance associated with a skeletal joint of the subject, and an empty state of the stack, and wherein the current activity comprises a non-deterministic state indicative of a non-identifiable activity.

The predefined set of actions comprises walking, sitting, standing, laying, appearing, and disappearing, and wherein the predefined action rule comprises at least one sequence of a plurality of actions from the predefined set of actions.

In another aspect, an identification system for identifying an activity performed by a subject is provided. The identification system comprising: a processor; an action identification module coupled to the processor to, obtain captured movements of the subject in real-time using a sensing device; and ascertain at least one action associated with the subject from a predefined set of actions, wherein a plurality of actions from the predefined set of actions collectively form at least one activity, the ascertaining being based on captured movements of the subject and at least one predefined action rule, the at least one predefined action rule being based on context-free grammar (CFG) and being indicative of a sequence of actions for occurrence of the at least one activity; and an activity determining module coupled to the processor to determine, dynamically, a current activity performed by the subject, based on the at least one action and an immediately preceding activity, using a non-deterministic push-down automata (NPDA) state machine. The identification system further comprising a skeleton data processing module coupled to, and executable by, the processor to, receive n skeleton frames of the person performing the at least one action, wherein the n skeleton frames are received from a skeleton recording device, and wherein each of the n skeleton frames represents data of N skeleton joints of the person; a preparation module coupled to the processor to, obtain the predefined set of actions, wherein the predefined set of actions comprises walking, sitting, standing, laying, appearing, and disappearing; and obtain the at least one predefined action rule, wherein the predefined action rule comprises at least one sequence of a plurality of actions from the set of actions, wherein the preparation module obtains at least one category of activities indicative of activities identifiable based on the at least one action alone, and wherein the action identification module is further configured to, compute a covariance matrix of a feature matrix for the at least one action, wherein the feature matrix is based on joint coordinates of the N skeleton joints from each of the n skeleton frames for the action; identify an error covariance matrix for the action based on value of n, value of N, and value of variance of the joint coordinates of one of the N skeleton joints, wherein the error covariance matrix represents noise present in the joint coordinates of the N skeleton joints; evaluate a noise-free covariance matrix for the at least one action based on the covariance matrix and the error covariance matrix for the action; determine an active joint matrix for the at least one action based on an active joint threshold and the noise-free covariance matrix for the at least one action, wherein the active joint matrix represents a plurality of most active joint coordinates that uniquely identifies the at least one action; identify the at least one action, from amongst the plurality of known actions, performed by the person based on the active joint matrix for the action.

In yet another aspect, a non-transitory computer-readable medium having embodied thereon a computer program for executing a method for identification of an activity performed by a subject based on sensor data analysis is provided. The method comprising: obtaining a set of actions, a plurality of actions from the set of actions collectively forming at least one activity; obtaining at least one action rule, wherein the at least one action rule is based on context-free grammar (CFG), the action rule being indicative of a sequence of actions for occurrence of the at least one activity; ascertaining at least one action associated with the subject from the set of actions, based on movements of the subject captured in real-time using a sensing device; and determining a current activity performed by the subject, using a non-deterministic push-down automata (NPDA) state machine, based on the at least one action, an immediately preceding activity, and a state of a stack of the NPDA state machine. The method further comprises receiving n skeleton frames of the subject performing the action, wherein the n skeleton frames are received from the sensing device, and wherein each of the n skeleton frames represents data of N skeleton joints of the subject; computing, by a processor (108), a covariance matrix of a feature matrix for the action, wherein the feature matrix is based on joint coordinates of the N skeleton joints from each of the n skeleton frames for the action; identifying, by the processor (108), an error covariance matrix for the action based on value of n, value of N, and value of variance of the joint coordinates of one of the N skeleton joints, wherein the error covariance matrix relates to noise present in the joint coordinates of the N skeleton joints of the subject; evaluating, by the processor (108), a noise-free covariance matrix for the action based on the covariance matrix and the error covariance matrix for the action; determining, by the processor (108), an active joint matrix for the action based on an active joint threshold and the noise-free covariance matrix for the action, wherein the active joint matrix represents a plurality of most active joint coordinates that uniquely identifies the action; and identifying, by the processor (108), the at least one action, from amongst the plurality of known actions, based on the active joint matrix.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration. The summary is not intended to identify essential features of the claimed subject matter nor is it intended for use in determining or limiting the scope of the claimed subject matter. Changes and modifications may be made within the scope of the embodiments herein.

BRIEF DESCRIPTION OF THE DRAWINGS

The embodiments herein will be better understood from the following detailed description with reference to the drawings, in which.

DETAILED DESCRIPTION

Figure 1:
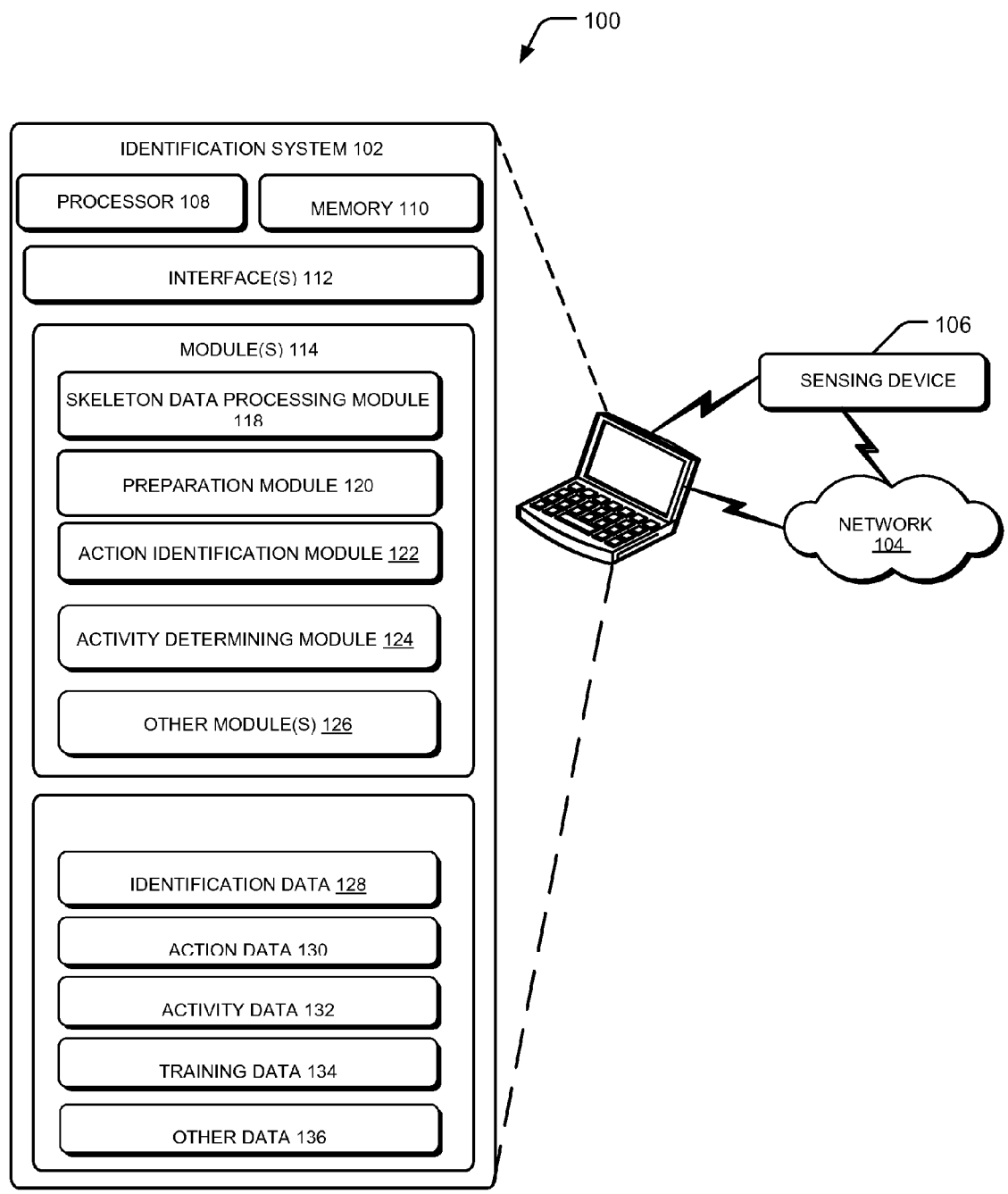
FIG. 1 illustrates a network environment implementing an identification system, in accordance with an embodiment of the present subject matter.

The present subject matter relates to identification of an activity performed by a subject based on sensor data analysis.

Conventionally, human activity recognition systems can determine various types of human acts, ranging from gestures to high level activities. Gestures can be understood as elementary level movements of a subject producing a motion of a subject's body part and can include, for example, stretching an arm or raising a leg. These elementary level movements when temporally grouped together form an intermediate level of movements, referred to as an action. Actions can be, for example, walking, sitting, and kicking. Further, multiple actions and gestures organized temporally form the high level activities, such as going outside a room, fighting, and playing football.

Conventional human activity recognition systems employ various techniques for recognizing human activities. In general, the conventional approach includes determination of the elementary level movements and then determining the activities based on the elementary level movements. However, such techniques involve considerable amount of computational resources and time for the recognition of human activities.

Further, other conventional techniques which make use of the intermediate level movements, such as actions, for the determination of the activities may use different approaches including statistical and syntactic techniques. As the name suggests, the statistical techniques involve use of statistical models, such as hidden Markov models (HMMs) and deep belief networks (DBNs), for determining the human activities. Such statistical models usually employ stochastic-based techniques or probability-based techniques to determine the human activity based on a random probability distribution, analyzed statistically. Accordingly, the human activity may not be precisely determined, thereby, lacking accuracy. In addition, few of the conventional techniques usually employ skeleton-sensing based models which are resource intensive and prone to errors.

The present subject matter relates to identification of an activity performed by a subject, such as a human, in accordance with an embodiment of the present subject matter. According to said embodiment, a set of actions and one or more predefined action rules are defined. As mentioned previously, the actions can be intermediate level movements, determined based on gestures or atomic level movements monitored by a sensing device. The sensing device can be, for example, a Kinect® device, a camera, a depth sensor, a red-green-blue (RGB) colour sensor, or a mobility sensor. In one case, the set of actions can include actions, such as walking, sitting, standing, lying, appearing, and disappearing. Various actions when temporally organized constitute an activity. In other words, a plurality of actions from the set of actions can collectively form one or more activities. Accordingly, the activities can be, for example, going outside a room, reading newspaper, drinking water, and coming from another room.

Each top-level activity can be associated with a sequence of actions based on the predefined action rules, and this information is used for identifying the activity. In an example, the action rules are based on context-free grammar (CFG), and are indicative of a sequence of actions for occurrence or non-occurrence of the activity. For example, an action rule can be that lying down cannot be immediately succeeded by disappearance from view, because the subject cannot disappear immediately after lying down. For instance, another action rule can be that lying down cannot be immediately succeeded by standing as a subject has to move to a sitting posture before standing up.

In operation, while determining the activity, an action associated with the subject is identified from among the set of actions, based on movements of the subject captured in real-time using the sensing device. Further, the identified action and an immediately preceding activity performed by the subject are dynamically analyzed, using a non-deterministic push-down automata (NPDA) state machine, to determine a current activity. In other words, the association between the activity and an identified sequence of actions is determined using the NPDA state machine. The NPDA state machine dynamically obtains the actions being performed by the subject, analyzes the actions based at least one of the action rules, and the one of the sequence of actions is accepted as the current activity. In an example, the sequence of actions which is acceptable according to the action rules, based on context-free grammar, is determined as the current activity.

As will be understood, the dynamicity of the actions causes dynamicity in decision-making while determining the current activity. For example, every time a new action is identified, there will be a different decision for determining the current activity, and generation of a different set of possible current activities which could be taking place with each new action. As mentioned above, one activity from the set of current activities is selected. In an example, the selected current activity can be used for identification of the subject, say based on historical data associated with the movements of the subject. In addition, such determination of the current activity can be used for surveillance for security purposes and for monitoring patients and elderly subjects.

In addition, the NPDA state machine takes into account non-determinism while identifying the current activity. Non-determinism can be understood as the condition in which the activity cannot be certainly determined. Therefore, in an implementation, the NPDA state machine is capable of determining whether the current activity is a non-identifiable activity or not, based on the immediately preceding activity and the identified action. For example, in case the immediately preceding activity is "standing idle" and the identified action is "null", i.e., no perceivable action is identified, then in such a case, the current activity is not identifiable or, in other words, non-deterministic. Such non-determinism makes the technique of activity identification reliable, since a forceful determination may otherwise lead to the identification of an incorrect state.

According to an aspect, the NPDA state machine employs a stack as a data structure for storing and analyzing the information, for identifying the current activity of the subject. In an example, each determined activity and identified action is pushed into the stack and a state of the stack is monitored. In an example, the state of the stack can refer to the populated state of the stack, i.e., whether the stack is populated or not. Further, the state of the stack is used in addition to the identified action and the immediately preceding activity, for determining the current activity. In effect, the immediately preceding activity and the identified action are both used to determine the current activity of the subject. For example, if the immediately preceding activity was waking up from bed and the identified action is walking followed by disappearing from view, then the current activity can be determined to be, say going to bathroom or leaving the room. Therefore, the present subject matter provides for accurate determination of the current activity using the NPDA state machine.

Further, in an implementation, based on whether the stack is empty or not, the NPDA state machine can achieve active joint extraction, i.e. use previously identified active joints of the subject, and can determine the current activity based on the active joint extraction and a predetermined identification parameters, such as height of the subject. In an example, the predetermined identification parameters can be read from the stack, say by popping the stack. As will be explained later, the current activity is temporarily determined since the stack is not empty, in which case in an example, a conclusive decision as to the current activity may not be made. Once the current activity is identified in the manner as explained, the state of the stack is checked again and the current activity determined accordingly. Therefore, as will be understood, the NPDA state machine can continuously determine the current activity as and when the actions are identified.

In an example, whether the current activity is different from the immediately preceding activity is determined based on the state of the stack of the NPDA state machine and the current action identified. For instance, for the current activity to be different from the immediately preceding activity, the stack state is "empty stack", i.e., there is nothing in the stack of the NPDA state machine to read. In one case, the empty stack can depict that no identification parameter associated with the immediately preceding activity is populated in the stack. Consider an example, where the immediately preceding activity is determined to be standing idle, the stack is determined to be empty, and the identified action is walking. In such a case, the current activity is identified to be going to bathroom or leaving the room. Now consider another example where the immediately preceding activity is determined to be sitting idle, the stack is determined to be empty, and the identified action is sitting. In such a case, the current activity is determined to be the same as the previous activity although the stack is empty. Therefore, in an example, while the empty stack state can be a factor in determining whether the current activity is different from the previous activity, the identified action can also be taken into consideration in determining so.

In addition, the present subject matter involves varying usage of the computational resources. Accordingly, for the purpose, the activities are classified based on whether the activities can be determined on the basis of the actions only or determining the activities entails analysis at a more atomic level requiring certain other information to supplement the actions. In the former case, the computational resources used for determining the activity are considerably lower than those in the latter case. Such selectively varying usage of the computational resources facilitates in optimal implementation of the computational resources.

In accordance with an example of the present subject matter, one or more categories of the activities are defined, the categories being indicative of activities identifiable based on the identified action alone. Subsequently, when the current activity is determined, another determination is made to ascertain as to whether the current activity falls within any of the defined categories and whether any other information is relevant for determining the activity. Further, in such a case, an identification parameter associated with the current activity is provided to the NPDA state machine. In one instance, the identification parameter is pushed into or populated in the stack of the NPDA state machine. Further, in an example, the identification parameter can include a timestamp associated with the current activity, a height of the subject, a covariance associated with a skeletal joint of the subject, and an empty state of the stack. In said example, the timestamp can be understood as an allowable time-window, say set by a user, for making the decision of the activity.

As would be understood, the pushing of the identification parameter into the NPDA state machine for determining the activity is in direct correlation with the dynamicity of the determining the activity associated with the dynamically identifying the actions, i.e., as the identified action changes dynamically, the possible options of the current activities also change, and the identification parameters associated with the current determined activity are pushed into the stack for facilitating in determining the current activity from the set of possible activities. Further, as is evident, the state of the stack is also updated dynamically, based on the identified activity.

While in one implementation, the present subject matter can be used for the identification of activities being performed by the subject in a reliable, accurate, and robust manner, the present subject matter also provides for checking the capabilities of the sensing device or sensors being used to capture the movements. For example, the reliability of the sensing device or the sensors can be assessed based on the above technique, and therefore, the present subject matter has widespread applicability.

Various systems for identifying actions performed by subjects have been developed in the past few years. Such systems can be used as activity monitoring systems to look after patients and elderly people. Some conventional systems deploy wearable sensors for action or activity recognition. The wearable sensors may provide real-time feedback to the system or to the subject wearing the wearable sensor, in order to alert the subject. The wearable sensors gather physiological and movement data of the subject to monitor health of the subject. The wearable sensors may monitor vital signs, for example, heart rate and respiratory rate of the subject. Similarly, movement of the subject is also captured and processed. Further, emergency situations, for example, falls can be detected via data processing and an alarm message is sent to the identification system so that assistance can be provided to the subject. However, such wearable sensors are bulky and are not comfortable to wear for longer durations. Further, due to the large size of the wearable sensors and front-end electronics, capturing of physiological and movement data becomes obtrusive for long-term monitoring applications.

Conventionally, the actions performed by the subjects can also be identified using mobile phones. Images and videos of a subject performing an action can be capturing using a mobile phone. However, action detection and classification based on images and video can be challenging because of camera motion, and significant variations in subject's posture and motion. Further, it may not be practically feasible to carry mobile phones all the time. Furthermore, camera based action identification may have privacy concerns where a subject does not agree to take his video or an image.

Moreover, few attempts have been made in the past to use a skeleton recording device, such as Kinect® device in order to identify actions performed by the subjects. The skeleton recording device includes an Infra-red (IR) camera to capture a skeleton model of a subject performing an action. The action can then be identified from the skeleton model. However, such attempts have been unsuccessful in identifying the action with substantial accuracy, as the skeleton recording device may introduce a substantial noise and error into the skeleton model obtained therefrom.

In accordance with the present subject matter, a system and a method for identification of an action, from amongst a plurality of known actions, performed by a subject, are described. In an example, the action may be one of many possible actions, such as a high arm wave, horizontal high wave, side boxing, and forward kick. Further, the system as described herein is referred to as an identification system. For the purpose of identification of an action being performed by a subject, the identification system is trained initially over a plurality of known actions performed by one or more training subjects. Then the action, from amongst the plurality of known actions, performed by any subject can be identified through the identification system.

In an implementation, for training the identification system, n skeleton frames of a training subject are received for each of the plurality of known actions being performed by the training subject. The n skeleton frames may be received from a skeleton recording device, for example, a Kinect® device. The value of n may depend on the number of skeleton frames through which the action can be captured. In an example, the value of n may be 45 or 50.

Further, each of the n skeleton frames may represent data of N skeleton joints of the training subject. In one example, each skeleton frame may represents 20 skeleton joints including a head joint, a shoulder centre joint, a shoulder left joint, a shoulder right joint, a spine joint, a hand left joint, a hand right joint, an elbow right joint, an elbow left joint, a wrist right joint, a wrist left joint, a hip left joint, a hip right joint, a hip centre joint, a knee right joint, a knee left joint, a foot left joint, a foot right joint, an ankle right joint, and an ankle left joint.

The data associated with the n skeleton frames for each known action is processed separately to obtain a set of features which is characteristic of a respective known action.

The set of features for each known action is obtained as a feature vector, referred to as a training feature vector, based on which the respective known action can be recognized and identified. Thus, the training feature vectors for the known actions are obtained, and the identification system is then trained based the training feature vectors.

In one implementation, to obtain the training feature vector for a known action, joint coordinates of the N skeleton joints are obtained from each of the n skeleton frames for that known action. In an example, x, y, and z Cartesian joint coordinates of each of the N skeleton joints are obtained from each skeleton frame. Once the joint coordinates of the N skeleton joints are obtained from the n skeleton frames, a feature matrix is evaluated. In one implementation, for each skeleton frame, joint coordinates of a stable skeleton joint are subtracted from the joint coordinates of the other skeleton joints to obtain a plurality of deviated skeleton joints. The stable skeleton joint may be a skeleton joint of the training subject which is near the centre of gravity of the training subject. In one example, the stable skeleton joint may be the hip centre joint. The plurality of deviated joint coordinates, for each of the n skeleton frames, may be arranged column-wise, i.e., in a respective column to form the feature matrix of n columns.

Further, based on the feature matrix for the known action, a covariance matrix is computed. The covariance matrix is computed by multiplying the feature matrix and its transpose. The covariance matrix includes an error component, which may be referred to as an error covariance matrix. The error covariance matrix may relate to noise present in the joint coordinates of the N skeleton joints from the n skeleton frames for the known action. In one example, the error covariance matrix may be identified based on the value of n, the value of N, and the value of variance of the joint coordinates of one of the N skeleton joints for the known action.

Once the error covariance matrix is identified, a noise-free covariance matrix is evaluated based on the covariance matrix and the error covariance matrix for the known action. Thereafter, an active joint matrix is determined, which represents a plurality of most active joint coordinates that uniquely defines and identifies the known action. The active joint matrix for the known action is determined based on an active joint threshold and the noise-free covariance matrix for the known action. The active joint threshold is a value that enables in segregating the active joint matrix from the noise-free covariance matrix. In an example, the active joint threshold is determined based on Eigen values of the noise-free covariance matrix and the value of N.

Further, after determining the active joint matrix for the known action, a histogram-based feature vector for the known action is computed based on the active joint matrix. The histogram-based feature vector represents a histogram of occurrences of the most active joint coordinates in the active joint matrix for the known action. Further, since most of the elements in the histogram-based feature vector are zero due to the sparse structure of active joint matrix, the histogram-based feature vector can be mapped to a lower-dimension vector using a pre-defined dimension reduction technique. The lower-dimension vector is the training feature vector, based on which the known action can be uniquely recognized and identified. The process described above is repeated to obtain the training feature vectors for all the known actions.

Although, it has been described that the training feature vector is determined for each of the plurality of known actions performed for one time, the training feature vectors can be determined for each of the plurality of known actions performed for multiple times, say r times. With this, r training feature vectors are determined for each known action. The training feature vectors for all the known actions performed r times are populated in a dataset and the identification system is trained for the dataset using a classifier. In one example, the classifier may be a Support Vector Machine (SVM) classifier.

In an implementation, for identification of an action performed by a subject in real-time, n skeleton frames of the subject performing the action are received. The subject may be any subject, and the action to be identified may be from amongst the known actions for which the identification system was trained. In an example, the subject may be an unknown subject. In one example, the n skeleton frames for the action of the subject may be received from a skeleton recording device, for example, a Kinect® device. Each of the n skeleton frames may represent data of N skeleton joints of the subject.

Thereafter, joint coordinates of the N skeleton joints are obtained from each of the n skeleton frames for the action of the subject. Once the joint coordinates of the N skeleton joints are obtained, a feature matrix is evaluated for the action of the subject. In one implementation, for each skeleton frame, joint coordinates of a relatively stable skeleton joint, for example, the hip centre joint, are subtracted from the joint coordinates of the other skeleton joints to obtain a plurality of deviated skeleton joints. Subsequently, the plurality of deviated joint coordinates, for each of the n skeleton frames, may be arranged column-wise to form the feature matrix of n columns.

Further, a covariance matrix of the feature matrix for the action of the subject is computed. The covariance matrix for the action of the subject includes an error component, which may be referred to as an error covariance matrix for the action. In one example, the error covariance matrix may be identified based on the value of n, the value of N, and the value of variance of the joint coordinates of one of the N skeleton joints for the action of the subject. Once the error covariance matrix is identified, a noise-free covariance matrix is evaluated based on the covariance matrix and the error covariance matrix for the action.

Thereafter, an active joint matrix for the action of the subject is determined, which represents a plurality of most active joint coordinates that uniquely defines and identifies the action. The active joint matrix for the action is determined based on an active joint threshold and the noise-free covariance matrix for the action of the subject. The active joint threshold is a value that enables in segregating the active joint matrix from the noise-free covariance matrix for the action of the subject. In one example, the action is identified based on the active joint matrix.

For identification of the action, a histogram-based feature vector for the action, performed by the subject, is computed based on the active joint matrix. The histogram-based feature vector represents a histogram of occurrences of the plurality of most active joint coordinates in the active joint matrix for the action of the subject. Subsequently, the histogram-based feature vector is mapped to a lower-dimension vector using a pre-defined dimension reduction technique. The lower-dimension vector is an identification feature vector that is unique for the identification. In one example, the identification feature vector is of a dimension smaller than that of the histogram-based feature vector for the action. Finally, the action performed by the subject is identified based on comparison of the identification feature vector with the training feature vectors for all the known actions for which the identification system was trained. Further, although, identification of an action is performed in real-time, however, the training of the identification system may or may not be performed in real-time.

According to the present subject matter, since the action is identified based on the skeleton joints from the skeleton frames of the subject received from a skeleton recording device, the identification of the action is unobtrusive and privacy of the subject is maintained. Further, the identification of the action of the subject also considers uncertainty due to presence of noise in the joint coordinates of the skeleton joints of the subject and the identification is based on most active joint coordinates that uniquely identify the action. As a result, the identification of the action of the subject is insensitive to small variations, in terms of noise, present in the skeleton joints. Therefore, the action of the subject is reliably and accurately identified in real-time.

The following disclosure describes system and method for identification of an action, from amongst a plurality of known actions, performed by a subject. While aspects of the described system and method can be implemented in any number of different computing systems, environments, and/or configurations, embodiments for identification of an action, from amongst a plurality of known actions, performed by a subject are described in the context of the following exemplary system(s) and method(s).

These and other advantages of the present subject matter would be described in greater detail in conjunction with the following figures. While aspects of described systems and methods for identification of an activity performed by a subject can be implemented in any number of different computing systems, environments, and/or configurations, the embodiments are described in the context of the following device(s).

FIG. 1 illustrates a network environment 100 implementing an identification system 102, in accordance with an embodiment of the present subject matter. The identification system 102 communicates with a sensing device 106 through a network 104. In one implementation, the network 104 may be a wireless network, a wired network, or a combination thereof. The network 104 may also be an individual network or a collection of many such individual networks, interconnected with each other and functioning as a single large network, e.g., the Internet or an intranet. The network 104 may be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include a variety of network devices, including routers, bridges, servers, computing devices, storage devices, and the like.

The identification system 102 may directly communicate with the sensing device 106, in one example embodiment. In said implementation, the identification system 102, can be implemented as a computing device, such as a laptop computer, a desktop computer, a notebook, a workstation, a mainframe computer, a server, and the like.

Further, in said implementation, the system 102 includes processor(s) 108, a memory 110, and an interface(s) 112. The processor 108 may be implemented as one or more microprocessors, microcomputers, microcontrollers, digital signal processors, central processing units, state machines, logic circuitries, and/or any devices that manipulate signals, based on operational instructions. Among other capabilities, the processor(s) 108 is provided to fetch and execute computer-readable instructions stored in the memory 110. The memory 110 may be coupled to the processor 108 and can include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes. Further, the interface(s) 112 may include a variety of software and hardware interfaces, for example, interfaces for peripheral device(s), such as a product board, a mouse, an external memory, and a printer. Additionally, the interface(s) 112 may enable the identification system 102 to communicate with other devices, such as web servers, one or more sensing devices and external repositories. The interface(s) 112 may also facilitate multiple communications within a wide variety of networks and protocol types, including wired networks, for example, LAN, cable, etc., and wireless networks, such as WLAN, cellular, or satellite. For the purpose, the interface(s) 112 may include one or more ports.

Further, the system 102 may include module(s) 114 and data 116. The modules 114 and the data 116 may be coupled to the processor 102. The modules 114, amongst other things, include routines, programs, objects, components, data structures, etc., which perform particular tasks or implement particular abstract data types. The modules 114 may also, be implemented as, signal processor(s), state machine (s), logic circuitries, and/or any other device or component that manipulate signals based on operational instructions.

In an implementation, the module(s) 114 include a skeleton data processing module 118, a preparation module 120, an action determining module 122, an activity determining module 124, and other module(s) 126. The action determining module 122 may also be referred to as an action identification module or an identification module. The action determining module 122, the action identification module, or an identification module may be interchangeably used in the entire specification, in one example embodiment. The other module(s) 116 may include programs or coded instructions that supplement applications or functions performed by the system 102. Additionally, in said implementation, the data 116 includes identification data 128, action data 130, activity data 132, training data 134, and other data 136. In one example, the training data 132 may include data relating to the plurality of known action performed by one or more training subject. The other data 136 amongst other things, may serve as a repository for storing data that is processed, received, or generated, as a result of the execution of one or more modules in the module(s). Although the data 116 is shown internal to the system 102, it may be understood that the data 116 can reside in an external repository (not shown in the figure), which may be operably coupled to the system 102. Accordingly, the system 102 may be provided with the interface(s) 112 to communicate with the external repository to obtain information from the data 116.

In addition, in an implementation, the system 102 can be coupled to one or more sensing devices 106 which can monitor movements of the subject. In an example, the sensing devices 106 can monitor and capture atomic level movements, i.e., gestures, in a raw form. In an example, the sensing device 106 can be a Kinect® device, a camera, a depth sensor, a red-green-blue (RGB) colour sensor, a mobility sensor, or a skeleton recording device. The skeleton recording device and the sensing device are interchangeably used, in one example embodiment. As will be understood that although the sensing devices 106 are shown external and separate from the system 102, the sensing devices 106 can be internal and integral to the system 102. In such a scenario, where the sensing device 106 may be integrated within the identification system 102, the identification system 102 communicates with the sensing device 102 by using the interface(s) 112.

The system 102 can monitor and obtain movements of the subject from the sensing device 106. Based on the movements, the system 102 identifies actions and, subsequently, activities being performed by the subject. Before the identification of the actions and the activities can be achieved, the system 102 is prepared for identifying the activities. Accordingly, in an implementation, a set of actions and one or more predefined action rules are defined and stored in the identification data 128. As explained in the previous sections, the actions can be intermediate level movements, determined based on atomic level movements monitored by the sensing device 106, when temporally organized constitute the activity. In one case, the set of actions can include actions, such as walking (W), sitting (S), standing (St), lying (L), appearing (ξ), and disappearing (σ). In addition, in an example, the action can include change in the height of the subject ($). Accordingly, the activities can be, for example, going to bathroom, reading newspaper, drinking water, and coming from bathroom.

In an example, during the operation, the sensing device 106 can identify coordinates for 20 skeleton joints in the body of the subject. Out of the 20 skeleton joints, the preparation module 120 can identify one pivot joint having a reliable signature for basic actions, such as walking (W), sitting (S), and standing (St), with respect to rest of the joints. For example, the hip joint can be identified as a pivot joint. Such actions can be understood to be associated with a noticeable movement of joints of hands and legs with respect to the hip joint. For instance, based on the coordinates of stationary pivot joint over a preset time interval, the action determining module 122 can determine the action to be W, while based on the relative position of head, hip and ankle joints, the action determining module 122 can identify the action to be L.

Further, the training data 134 stored in the database may be retrieved whenever an action, from amongst the plurality of known actions, is to be identified by the identification system 102. Furthermore, the training data 134 contained within such external database may be periodically updated. For example, new training data may be added into the database, existing training data 134 may be modified, or non-useful training data may be deleted from the database.

In one embodiment of the present subject matter, for the purpose of identification of the action being performed by an unknown subject, the identification system 102 is initially trained over the plurality of known actions performed by one or more training subjects, and then the action, from amongst the plurality of known actions, performed by the unknown subject is identified through the identification system 102. The identification system 102 may be pre-trained, i.e., may not be trained in real-time; however, the identification of an action of an unknown subject is performed in real-time through the identification system 102.

In an implementation, for training the identification system 102, the skeleton data processing module 118 may receive n skeleton frames of a training subject for each of the plurality of known actions being performed by the training subject. In one example, the skeleton data processing module 118 may receive the n skeleton frames from the skeleton recording device 104. Each of the n skeleton frames may represent data of N skeleton joints of the training subject. In one example, the N skeleton joints may be 20 skeleton joints including a head joint, a shoulder centre joint, a shoulder left joint, a shoulder right joint, a spine joint, a hand left joint, a hand right joint, an elbow right joint, an elbow left joint, a wrist right joint, a wrist left joint, a hip left joint, a hip right joint, a hip centre joint, a knee right joint, a knee left joint, a foot left joint, a foot right joint, an ankle right joint, and an ankle left joint.

According to one implementation, the identification system 102 processes the data associated with the n skeleton frames for each known action separately to obtain a feature vector, referred to as a training feature vector, based on which the respective known action can be recognized and identified. The identification system 102 is then trained based the training feature vectors for the known actions.

In one implementation, to obtain the training feature vector for a known action, the skeleton data processing module 118 obtains joint coordinates of the N skeleton joints from each of the n skeleton frames for that known action. In an example, the skeleton data processing module 118 obtains x, y, and z Cartesian joint coordinates of each of the N skeleton joints from each skeleton frame. Thus, for N skeleton joints from each skeleton frame, the skeleton data processing module 118 obtains 3N joint coordinates. For instance, if each of the n skeleton frames represents 20 skeleton joints, then for each frame, the skeleton data processing module 118 obtains 60 joint coordinates (20*3=60).

Once the skeleton data processing module 118 obtains 3N joint coordinates of the N skeleton joints from each of the n skeleton frames, the action determining module 122 evaluates a feature matrix for the known action. To evaluate the feature matrix, the action determining module 122, for each skeleton frame, subtracts joint coordinates of a stable skeleton joint, for example, the hip centre joint, from the joint coordinates of the other skeleton joints to obtain $3(N-1)$ deviated skeleton joints. For instance, if N=20, then the skeleton data processing module 118 obtains 57 (60−3=57) deviated skeleton joints for each skeleton frame. Subsequently, the action determining module 122 arranges the $3(N-1)$ deviated joint coordinates, for each of the n skeleton frames, column-wise to form the feature matrix of $3(N-1)$ rows and n columns. Therefore, in the feature matrix, the columns represent $3(N-1)$ deviated joint coordinates and the rows represent n skeleton frames. In the context of the present subject matter, the feature matrix is mathematically represented by equation (1) provided below.

$$F = [\ldots]_{3(N-1) \times n} \quad (1)$$

Further, based on the feature matrix for the known action, the action determining module 122 computes a covariance matrix H of the feature matrix F for the known action. The covariance matrix H is computed based on equation (2) provided below.

$$H = F * F^T \quad (2)$$

where $F^T$ represents transpose of the feature matrix F.

Further, the covariance matrix H includes an error component and a noise-free component. The error component may relate to noise present in the joint coordinates of the N skeleton joints from the n skeleton frames for the known action and may be referred to as an error covariance matrix. The noise-free component may be referred to as a noise-free covariance matrix. Thus, the covariance matrix H may be represented by equation (3) provided below.

$$H = T + S \qquad (3)$$

where T represents the error covariance matrix and S represents noise-free covariance matrix.

According to an implementation, the action determining module 122 may identify the error covariance matrix T based on the value of n, the value of N, and the value of variance of the joint coordinates of one of the N skeleton joints for the known action. In an example, considering that variance is uniform for all the skeleton joints, the action determining module 122 may determine the variance of joint coordinates of any one skeleton joint over all the skeleton frames. In an example, the action determining module 122 may determine the variance of the hip centre joint over the n skeleton frames.

In one example, the action determining module 122 identifies the error covariance matrix T based on determining its diagonal elements and off-diagonal elements. The action determining module 122 computes the diagonal elements of the error covariance matrix T using equation (4) provided below:

$$T(i, j) = n\left(\frac{6N - S}{3(N - 1)}\right)\sigma^2, \text{ for } i = j \qquad (4)$$

where, $T(i,j)$ for $i=j$ represents an $(i,j)^{th}$ diagonal element of the error covariance matrix; n represents the total number of skeleton frames; N represents the total number of skeleton joints; and $\sigma^2$ represents variance of the joint coordinates of the N skeleton joints.

Further, the action determining module 122 computes the off-diagonal elements of the error covariance matrix T using equation (5) and equation (6) provided below:

$$T(i, j) = n\left(\frac{3N - 2}{3(N - 1)}\right)\sigma^2, \text{ for } i \neq j \text{ and } (i \bmod 3) = (j \bmod 3) \qquad (5)$$

$$T(i, j) = \frac{n\sigma^2}{3(N - 1)}, \text{ for } i \neq j \text{ and } (i \bmod 3) \neq (j \bmod 3) \qquad (6)$$

where, $T(i,j)$ for $i \neq j$ represents an $(i,j)^{th}$ off-diagonal element of the error covariance matrix; n represents the total number of skeleton frames; N represents the total number of skeleton joints; and $\sigma^2$ represents the value of variance of the joint coordinates of the N skeleton joints.

Once the action determining module 122 identifies the error covariance matrix T for the known action, the action determining module 122 evaluates the noise-free covariance matrix S by subtracting the error covariance matrix T from the covariance matrix H for the known action. Thus, the action determining module 122 evaluates the noise-free covariance matrix S using equation (7) provided below:

$$S = H - T \qquad (7)$$

Thereafter, the action determining module 122 determines an active joint matrix A from the noise-free covariance matrix S. In one example, the active joint matrix A represents a plurality of most active joint coordinates that uniquely defines and identifies the known action. In one implementation, the action determining module 122 determines the active joint matrix A for the known action based on an active joint threshold $\delta$. The active joint threshold $\delta$ is a value that enables in segregating the active joint matrix A from the noise-free covariance matrix S. In one example, the action determining module 122 determines the active joint matrix A using equation (8) provided below:

$$A(i,j) = S(i,j), \text{ for } |S(i,j)| > \delta,$$

$$\text{else } A(i,j) = 0 \qquad (8)$$

where $A(i,j)$ represents an $(i,j)^{th}$ element of the active joint matrix A, and $S(i,j)$ represents an $(i,j)^{th}$ element of the noise-free covariance matrix S.

The description below describes the procedure to determine the active joint threshold $\delta$. For this, the action determining module 122 initializes an iterative process, where in the first iteration, the action determining module 122 defines an arbitrary value for the active joint threshold, which may be referred to as a first threshold and represented by $\delta_1$. The action determining module 122 also defines a stopping threshold represented by $\eta$. The stopping threshold $\eta$ is the minimum threshold beyond which the value of the active joint threshold $\delta$ is considered optimal. Subsequently, based on the first threshold $\delta_1$ and the stopping threshold $\eta$, the action determining module 122 calculates a first active joint matrix $A_{\delta 1}$. The action determining module 122 calculates the first active joint matrix $A_{\delta 1}$ using equation (9) provided below:

$$A_{\delta 1}(i,j) = S(i,j), \text{ for } |S(i,j)| > \delta_0,$$

$$\text{else } A_{\delta 1}(i,j) = 0 \qquad (9)$$

where $A_{\delta 1}(i,j)$ represents an $(i,j)^{th}$ element of the first active joint matrix $A_{\delta 1}$, and $S(i,j)$ represents an $(i,j)^{th}$ element of the noise-free covariance matrix S.

Further, the action determining module 122 determines a first non-active joint matrix $D_{\delta 1}$ using equation (10) provided below:

$$D_{\delta 1}(i,j) = S(i,j), \text{ for } |S(i,j)| \leq \delta_1,$$

$$\text{else } D_{\delta 1}(i,j) = 0 \qquad (10)$$

where $D_{\delta 1}(i,j)$ represents an $(i,j)^{th}$ element of the first non-active joint matrix $D_{\delta 1}$, and $S(i,j)$ represents an $(i,j)^{th}$ element of the noise-free covariance matrix S.

Further, the action determining module 122 calculates a lower-bound $\delta_{LB1}$ of the first threshold $\delta_1$ using equation (11) provided below:

$$\delta_{LB1} = \frac{|\hat{\lambda}\max - \lambda\max|}{3(N - 1)\sqrt{\beta}} \qquad (11)$$

where $\beta$ is a proportion of non-zero entries among the entries in the first non-active joint matrix $D_{\delta 1}$, $\hat{\lambda}\max$ is the maximum Eigen values of the first active joint matrix $A_{\delta 1}$, $\lambda\max$ is the maximum Eigen values of the noise-free covariance matrix S, and N is the value of skeleton joints.

The action determining module 122 also calculates an upper-bound $\delta_{UB1}$ of the first threshold $\delta_1$ using equation (12) provided below:

$$\delta_{UB1} = |\hat{\lambda}\max| \qquad (12)$$

where $\hat{\lambda}\max$ is the maximum Eigen values of the first active joint matrix $A_{\delta 1}$.

Thereafter, the action determining module 122 ascertains whether the first threshold $\delta_1$ is close to the lower-bound $\delta_{LB1}$ such that $|\delta_1 - \delta_{LB1}| \leq \eta$ and $\delta_1 \in (\delta_{LB1}, \delta_{UB1})$. In case the described conditions are true, the first threshold $\delta_1$ is the considered as the active joint threshold δ. If the described conditions are not true then the identification calculates second threshold $\delta_2$ using equation (13) provided below:

$$\delta_2 = \delta_{LB1} + \eta \tag{13}$$

where $\delta_{LB1}$ is the lower-bound of the first threshold $\delta_1$, and $\eta$ is the stopping threshold.

Thereafter, in the second iteration, the action determining module 122 calculates a second active joint matrix $A_{\delta 2}$, a second non-active joint matrix $D_{\delta 2}$, an upper-bound $\delta_{UB2}$ of the second threshold $\delta_2$, and the lower-bound $\delta_{LB2}$ of the second threshold $\delta_2$, based on the second threshold $\delta_2$, in a similar manner as described above through equations (9), (10), (11), and (12). Thereafter, the action determining module 122 ascertains whether the second threshold $\delta_2$ is close to the lower-bound $\delta_{LB2}$ such that $|\delta_2 - \delta_{LB2}| \leq \eta$ and $\delta_2 \in (\delta_{LB2}, \delta_{UB2})$. In case the described conditions are true, the second threshold $\delta_2$ is the considered as the active joint threshold δ. If the described conditions are not true then the identification calculates a third threshold $\delta_3$, using equation (14) provided below.

$$\delta_3 = \delta_2 + c\Delta\lambda\max - (1-c)(\delta_2 - \delta_{LB2}), \tag{14}$$

where c is a scaling constant, and $\Delta\lambda\max$ is the difference between the maximum Eigen values of the current active joint matrix (the second active joint matrix $A_{\delta 2}$) and the previous active joint matrix (the first active joint matrix $A_{\delta 1}$).

Thereafter, the action determining module 122 proceeds to the third iteration to calculate the third active joint matrix $A_{\delta 3}$, the third non-active joint matrix $D_{\delta 3}$, the upper-bound $\delta_{UB3}$ of the third threshold $\delta_3$, and the lower-bound $\delta_{LB3}$ of the third threshold $\delta_3$, based on the third threshold $\delta_3$, in a similar manner as described above through equations (9), (10), (11), and (12). In one example, the action determining module 122 performs the iterative process, as described above, till the jth iteration, $|\delta_j - \delta_{LBj}| \leq \eta$ and $\delta_j \in (\delta_{LBj}, \delta_{UBj})$.

Further, after determining the active joint matrix A for the known action, the action determining module 122 computes a histogram-based feature vector for the known action based on the active joint matrix A. The histogram-based feature vector represents a histogram of occurrences of the most active joint coordinates in the active joint matrix A for the known action. The action joint matrix A is a 3(N−1)×3(N−1) matrix. For this, the histogram-based feature vector, computed based on the active joint matrix A, is of a length 3(N−1) having 3(N−1) elements. Initially, the action determining module 122 sets the histogram-based feature vector as a null vector, where each element of the histogram-based feature vector is zero. Thereafter, the action determining module 122 parses the active joint matrix A, and checks the value each (i,j) element of the active joint matrix A. For each $(i,j)^{th}$ non-zero element in the active joint matrix A, the action determining module 122 appends the values at the $i^{th}$ element and the $j^{th}$ element of the histogram-based feature vector by 1 respectively. For example, if the $(1,4)^{th}$ element in the active joint matrix A is non-zero, then the values of $1^{st}$ element and the $4^{th}$ element in the histogram-based feature vector as appended by 1, respectively. Then, if the $(1,7)^{th}$ element in the active joint matrix A is non-zero, then the values of $1^{st}$ element and the $7^{th}$ element in the histogram-based feature vector as appended by 1, respectively. This process is repeated for all the non-zero elements in the active joint matrix A to compute the histogram-based feature vector for the known action.

Subsequently, the action determining module 122 computes the training feature vector for the known action based on the histogram-based feature vector. The dimension of the training feature vector is smaller than the dimension of the histogram-based feature vector. For this, the action determining module 122 maps the histogram-based feature vector of dimension 3(N−1) to a lower-dimension vector, of dimension m, where m<<3(N−1). The lower-dimension vector is the training feature vector, based on which the known action can be uniquely recognized and identified. In an implementation, the action determining module 122 computes the training feature vector for the known action based on a pre-defined dimension reduction technique performed on the histogram-based feature vector for the known action.

The description below describes the procedure to compute the training feature vector from the histogram-based feature vector, according to an implementation. The feature values or the elements in the histogram-based feature vector of 3(N−1) dimension can be considered as points in a 3(N−1) dimensional space. Each of the elements in the histogram-based feature vector is approximated by a linear combination of k number of other elements in the histogram-based feature vector that are close to that element. For an element in the histogram-based feature vector, the k other elements are referred to as the neighboring elements of that element. In an implementation, k<3(N−1). For this, the action determining module 122 multiplies the neighboring elements for each of the elements by a weight vector. The elements of the histogram-based feature vector get approximated when the following term is minimum:

$$\Sigma_{i=1}^{3(N-1)} \|h_i - \Sigma_{j=1}^k w_{ij} h_j\|^2 \tag{14}$$

where, $h_i$ represents the $i^{th}$ element of the histogram-based feature vector, $h_j$ represents the neighboring element of the $i^{th}$ element, $w_{ij}$ represents the element of the weight vector multiplied by the neighboring elements, and k represents a number of neighboring elements. In one example, the value of k is 5. Therefore, the $i^{th}$ element $h_i$ is approximated using 5 neighboring elements of $h_i$ multiplied by weight $w_{ij}$. The action determining module 122 then minimizes the above term and determines the weight vector corresponding to each element of the histogram-based feature vector.

Now, starting with the weight vectors, the action determining module 122 computes a low-dimension vector of dimension m, where m<<3(N−1), such that each element of the low-dimension vector can be approximated as a linear combination of k neighboring elements in the low-dimension vector, using the weight vectors. In an example, the value of m is 10, and the value of k is 5. The elements of the low-dimension vector get approximated when the following term is minimum:

$$\Sigma_{i=1}^{m} \|y_i - \Sigma_{j=i}^k w_{ij} y_j\|^2 \tag{15}$$

where, $y_i$ represents the $i^{th}$ element of the low-dimension vector, $y_j$ represents the neighboring element of the low-dimension vector corresponding to the $i^{th}$ element of the low-dimension vector, $w_{ij}$ represents the element of the weight vector, and k represents a number of neighboring elements. The action determining module 122 then minimizes the above term and determines the low-dimension vector. This low-dimension vector is the training feature vector for the known action. The action determining module 122 repeats the process as described above to obtain the training feature vectors for all the known actions.

Further, although, it has been described that the action determining module 122 computes the training feature vector for each of the plurality of known actions performed for one time, the action determining module 122 may compute the training feature vectors for each of the plurality of known actions performed for multiple times, say r times. With this, the action determining module 122 computes r training feature vectors for each known action.

Thereafter, the action determining module 122 stores the training feature vectors for all the known actions performed r times in the training data 134 and the identification system 102 is trained for the training data 134 using a classifier. In one example, the classifier may be a Support Vector Machine (SVM) classifier.

Although it has been described the identification system 102 computes the training feature vectors for all the known actions; however, in an implementation, the training feature vectors for all the known actions may be computed by an external computing device and stored in an external memory. The identification system 102 may obtain the training feature vectors from the external memory whenever the action of an unknown subject is to be identified. The manner in which the identification system 102 identifies the action of an unknown subject is described henceforth.

In an implementation, for identification of an action performed by the unknown subject in real-time, the skeleton data processing module 118 may receive n skeleton frames of the unknown subject performing the action. In one example, the skeleton data processing module 118 may receive the n skeleton frames from the skeleton recording device 106. Each of the n skeleton frames represents data of N skeleton joints of the subject. In an example, the action may be from amongst the known actions for which the identification system 102 was trained.

Thereafter, the skeleton data processing module 118 obtains joint coordinates of the N skeleton joints from each of the n skeleton frames for the action of the unknown subject. In an example, the skeleton data processing module 118 obtains x, y, and z Cartesian joint coordinates of each of the N skeleton joints from each skeleton frame. Thus, for N skeleton joints from each skeleton frame, the skeleton data processing module 118 obtains 3N joint coordinates. Once the skeleton data processing module 118 obtains joint coordinates of the N skeleton joints from the n skeleton frames, the action determining module 122 subtracts the joint coordinates of a stable joint, for example, a hip centre joint from the joint coordinates of the other joints to obtain 3(N−1) deviated skeleton joints and arranges the 3(N−1) deviated joints for each skeleton frame column-wise to evaluate a feature matrix F' for the action of the unknown subject. This feature matrix F' is a matrix of 3(N−1)×n dimension and can be represented as shown through equation (1).

Further, based on the feature matrix F' for the action of the unknown subject, the action determining module 122 computes a covariance matrix H' of the feature matrix F'. Subsequently, the action determining module 122 identifies an error covariance matrix T' for the action of the unknown subject based on value of n, value of N, and value of variance of the joint coordinates of one of the N skeleton joints of the unknown subject. In one example, the action determining module 122 identifies the error covariance matrix T' by determining its diagonal elements and off-diagonal elements in a manner as described earlier, based on using equations (4), (5), and (6).

Thereafter, the action determining module 122 evaluates a noise-free covariance matrix S' for the action of the unknown subject by subtracting the error covariance matrix T' from the covariance matrix H'. Further, the action determining module 122 determines an active joint matrix A' for the action of the unknown subject which represents most active joint coordinates that uniquely defines and identifies the action of the unknown subject. The active joint matrix A' is determined based on an active joint threshold δ' and the noise-free covariance matrix S' for the action of the unknown subject. As mentioned earlier, the active joint threshold δ' is a value that enables in segregating the active joint matrix A' from the noise-free covariance matrix S'. In one example, the action determining module 122 evaluates the active joint threshold δ' based on the noise-free covariance matrix S' in a similar manner as described earlier for the training of the identification system 102. Based on the active joint threshold δ', the action determining module 122 determines the active joint matrix A' from the noise-free covariance matrix S' through equation (8) as described earlier.

After determining the active joint matrix A' for the action of the unknown subject, the action determining module 122 determines a histogram-based feature vector for the action of the unknown subject based on the active joint matrix A'. The length of the histogram-based feature vector is 3(N−1). In an example, the histogram-based feature vector for the action of the unknown subject is determined from the active joint matrix A' in a similar manner as described earlier for the training of the identification system 102.

Subsequently, the action determining module 122 computes an identification feature vector for the action of the unknown subject based on the histogram-based feature vector for the unknown subject. In an example, the identification feature vector is a low-dimension vector with a dimension smaller than the dimension of the histogram-based feature vector. In an example, the action determining module 122 computes the identification feature vector for the action of the unknown subject in a similar manner as described earlier for determining a low-dimension training feature vector for a known action of a training subject.

Thereafter, the action determining module 122 compares the identification feature vector with the training feature vectors for each of the known actions and identifies the action, from amongst the known actions, performed by the unknown subject.

Further, the activity determining module 124 can determine an activity associated with one or more actions (or a set of actions) by determining a change in actions in a temporal sequence.

Further, in the preparation stage, each activity can be associated with a sequence of actions based on the predefined action rules, and this information is stored in the identification data 128 and used for identifying the activity. In an example, the activities formed from one or more sequences of the above mentioned actions can include going to bathroom, coming from bathroom, reading newspaper, going to bed, watching television, waking up, drinking water, and taking medicine. For instance, the sequence of actions lying-sitting-standing-walking-disappearing can be the activity of "going to bathroom".

The actions and activities can be understood with reference to the following example. In said example, the sensing device 106 can identify coordinates for 20 skeleton joints in the body of the subject. Out of the 20 skeleton joints, the preparation module can consider the hip joint as a pivot point having reliable signature for basic actions, such as walking (W), sitting (S), and standing (St), with respect to the rest of the joints. Such actions can be understood to be associated with a noticeable movement of joints of hands and legs with respect to the hip joint. For instance, based on the coordinates of the stationary pivot joint over a preset time interval, the action determining module 122 can determine the action to be W, while based on the relative position of head, hip and ankle joints, the action determining module 122 can identify the action to be L. Further, the activity determining module 124 can determine the activity associated with a set of actions by determining a change in actions in the temporal sequence.

In addition, in one instance, the action rules can be based on context-free grammar (CFG), and are indicative of a sequence of actions for occurrence or non-occurrence of the activity. For example, an action rule can be that lying cannot be immediately succeeded by disappearance, because the subject cannot disappear immediately after lying down. Similarly, another action rule can be that lying cannot be immediately succeeded by standing. Say, WWStStStWW could be a valid sequence whereas the sequence WWLL indicating a direct transition from walking to laying can be considered as an invalid sequence. In addition, in one case, the action rules can disregard the number of action instances, i.e., the number of consecutive W or St in the above example.

According to an aspect, the system 102 can be employed for identifying the activities performed by two subjects in the field of sensing of the sensing device 106. In such a case, in an example, as part of the action rules, two operators of concatenation (.) and addition (+) of symbols are defined. In an example, concatenation can be understood as a sequence of action units defining activities performed by a subject whereas addition operation can be used for describing an action performed by two different subjects at the same instant or the same action performed by a subject at two different time instances. Further, using the concatenation operation and the addition operation, action properties can be defined in the action rules with reference to the actions. For example, the action properties can include non-commutativity, distributivity, and associativity. These properties are illustrated by following relations as examples:

Property 1: $s_i s_j \neq s_j s_i \forall s_i, s_j \in S$ (Non-commutativity)

Property 2: $s_i \cdot (s_j + s_k) = s_i s_j + s_i s_k$ (Distributivity)

Property 3: $(s_i \cdot s_j) \cdot s_k = s_i \cdot (s_j \cdot s_k)$ (Associativity in concatenation)

Property 4: $(s_i + s_j) + s_k = s_i + (s_j + s_k)$ (Associativity in addition)

In the above relations, the set of all symbols $s_i$, $s_j$, and $s_k$ is given by S. As has been explained, the action rules provide for assessing validity of possible combinations of symbols taken in various sequences to form an activity.

Once the system 102 is prepared, and the set of actions and action rules stored, the system 102 can be used for monitoring and identifying activities of the subject. In another implementation, the set of actions and the action rules can be predefined and stored in an external repository. In such a case, the preparation module 120 can obtain the set of actions and the action rules from the external repository and deploy them for identifying the activity.

In operation, to identify the activity of the subject, the sensing device captures the movements of the subject in real-time and provides the movements to the action determining module 122. The action determining module 122 can, in turn, identify from among the actions in the set of actions, an action being performed by the subject, based on the captured movements. The action determining module 122 can store the identified actions in the action data 130.

In an example, the action determining module 122 can formulate each action in terms of a series, say using the action properties defined in the action rules. The action determining module 122 can validate each term in the expansion of each of these series based on the action rules. For example, consider a case that one subject is identified to be in a state of walking for time T and another subject is found to be in the state of walking for infinite time. The series for the two subjects can be provided as follows, in an example:

$$(W^1 + W^2 + \ldots + W^T) \quad (1)$$

$$(W^1 + W^2 + \ldots + W^\infty) \quad (2)$$

In the above relations (1) and (2), the superscripts denote the frame in which the action is identified. For example, $W^n$ means walking identified in the $n^{th}$ frame, say of the video captured by the sensing device 106.

Further, for a subject walking for time T and then standing for time T1, the series can be represented as follows, as an example:

$$(W^1 + W^2 + \ldots + W^T)(St^1 + St^2 + \ldots + St^{T1}) \quad (3)$$

Further, in an implementation, the activity determining module 124, dynamically analyzes the identified action (at least one action identified by the action determining module 122) and an immediately preceding activity performed by the subject, using a non-deterministic push-down automata (NPDA) state machine, to determine the current activity. In other words, the association between the activity and the action with identification of sequence of actions is determined using the NPDA state machine. In one example, the activity determining module 124 implement the NPDA state machine, based on the NPDA rules stored in the activity data 132. The activity determining module 124 dynamically obtains the actions being performed by the subject, analyzes the actions based at least on the action rules, and the most appropriate sequence of actions is accepted as the current activity. In one example, every time the action determining module 122 identifies a new action, the activity determining module 124 re-determines the current activity based on the above mentioned parameters. In one implementation, the activity determining module 124 can generate a set of possible current activities while identifying the current activity. In said implementation, each time a new action is identified, the activity determining module 124 can generate a different set of possible activities which could be taking place with each new action. As will be explained later in detail, the activity determining module 124 can select the most appropriate activity from the set of current activities, based on a state of a stack of the NPDA state machine.

In an example, for implementing the NPDA state machine, the activity data 132 can serve as the stack of the NPDA state machine. The stack can be understood as a data structure for storing and analyzing the information, such as the identified action and the immediately preceding activity, for identifying the current activity of the subject. In an example, the activity determining module 124 can push each previously determined activity and the identified action into the stack and, subsequently, read the pushed information.

Further, as mentioned above, the activity determining module 124 can use the state of the stack as a parameter in addition to the identified action and the immediately preceding activity, for determining the current activity. For example, the activity determining module 124 may use the immediately preceding activity and the identified action for determining the current activity of the subject. For example, consider that the activity determining module 124 determines waking up as the immediately preceding activity followed by walking and disappearing as the actions identified by the action determining module 122. In such a case, the current activity can be determined to be, say going to bathroom or leaving the room. Unless the actions of walking and disappear follow the activity of waking up in the stack, the activity determining module 124 would be unable to determine the current activity to be going to bathroom. Therefore, the activity determining module 124 uses the identified action pushed into the stack, along with the immediately preceding activity to determine the current activity.

In an example, for determining the current activity, the stack state is "empty stack", i.e., there is nothing in the stack to read. In addition, the activity determining module 124 can determine whether the current activity is different from the immediately preceding activity, based on the state of the stack of the NPDA state machine. For example, for the current activity to be different from the immediately preceding activity, the stack state can be the same as above, i.e., "empty stack".

Consider an example, where the activity determining module 124 determines the immediately preceding activity to be standing idle, the stack to be empty, and the identified action to be walking. In such a case, the activity determining module 124 can determine that the current activity is going to bathroom or leaving the room. Now consider another example where the activity determining module 124 determines the immediately preceding activity to be sitting idle, the stack to be empty, and the identified action to be sitting. In such a case, the activity determining module 124 determines that the current activity is the same as the previous activity although the stack is empty. Therefore, in an implementation, the activity determining module 124 can use the stack state as a factor along with the identified action in determining whether the current activity is different from the previous activity. In the latter case, the activity determining module 124 can push the identification parameters, say height and timestamp, into the stack of the NPDA state machine.

Further, in an implementation, based on whether the stack is empty or not, the activity determining module 124 can achieve active joint extraction, i.e., use previously identified active joints of the subject, and can determine the current activity based on the active joint extraction and a predetermined identification parameters, such as height of the subject. In an example, the activity determining module 124 can read the predetermined identification parameters from the stack, say by popping the stack, of the NPDA state machine. In an example, as will be explained later, the activity determining module 124 temporarily determines the current activity temporarily since the stack is not empty, in which case, in an example, the activity determining module 124 is unable to make a conclusive decision as to the current activity. Once the activity determining module 124 identifies the current activity in the manner as explained, the activity determining module 124 checks the state of the stack and determines the current activity accordingly. Therefore, as will be understood, the activity determining module 124 can continuously determine the current activity as and when the actions are identified.

In addition, the activity determining module 124 can implement the NPDA state machine to take into consideration non-determinism while identifying the current activity. Non-determinism can be understood as the condition in which the activity cannot be certainly determined. Therefore, in an implementation, the activity determining module 124 can determine whether the current activity being performed by the subject is a non-identifiable activity or not, based on the immediately preceding activity and the identified action. For example, in case the activity determining module 124 determines that the immediately preceding activity is "sitting idle" and the identified action is "null", i.e., no perceivable action is identified, then in such a case, the activity determining module 124 determines that the current activity is not identifiable. In such a case, as would be understood, the state of the stack is immaterial and the activity determining module 124 does not take into consideration the state of the stack. Such non-determinism makes the technique of activity identification, in accordance with the present subject matter, reliable and robust.

In addition, the system 102 can provide for varying usage of the computational resources while determining the activity. Accordingly, for the purpose, in the preparation stage, the activities are classified based on the whether the activities can be determined on the basis of the actions only or the determining the activities entails further analysis and requires additional information to identify the activity. In one case, one or more categories of the activities are defined, the categories being indicative of the activities identifiable based on the identified action alone. In an example, the aforementioned examples of the activities can be classified into two categories, one requiring additional information for determining the activity and, for the other, the identified actions sufficing for determining the activity. For instance, the former category can include reading newspaper, drinking water, taking medicines, and watching television, and the latter category can include going to bathroom, coming from bathroom, waking up, and going to bed. The classification of activities into the different categories may be based on, say observation and real-life experience.

Subsequently, when the activity determining module 124 determines the current activity being performed by the subject, the activity determining module 124 also ascertains as to whether the current activity falls within any of the defined categories and whether any other information is relevant to ascertain the current activity, say from the set of possible activities. Further, in such a case, the activity determining module 124 can provide an identification parameter associated with the current activity to the NPDA state machine. In one instance, the activity determining module 124 can push or populate the identification parameter in the stack, i.e., the activity data 132. In an example, the identification parameter can include a timestamp associated with the current activity, a height of the subject, a covariance associated with a skeletal joint of the subject, and an empty state of the stack.

In the above mentioned example, the timestamp can be understood as an allowable time-window, say set by a user, for making the decision of the activity. For instance, for the activity of "going to bathroom", the average time or the timestamp can be 20 minutes. In such a case, if the subject is not detected after 20 minutes, then the system can generate an alert for other users, say family of the subject or an attendant. Further, in the above mentioned example, similarity in covariance values of joints can be measured to identify a subject status. Say, if the subject is not moving, i.e., the subject is standing or sitting idle, covariance values for a joint are approximately same, with respect to some statistical distance. In such a case, the decision making on the current activity can be achieved using the covariance values of one or more skeletal joints.

According to an aspect, the activity determining module 124 can perform error correction in case the action or, therefore, the activity is incorrectly identified. Such an error correction offers flexibility to the action rules, say the context free grammar based on which the action rules can be formed. As mentioned previously, the pivot joint and position relative of the pivot joint to other joints or joint coordinate over a time interval is used to identify the basic action instances. However, even after noise correction, symbol error may occur due to confusion in the joint coordinate values. For example, z dimension of a hip joint for a given time interval is often the source of confusion between W, St or ξ. As part of the error correction, the activity determining module 124 can operate based on two assumptions. Firstly, there exists a valid sequence of symbols with respect to an action rule in a string of symbols to be corrected and, secondly, that there exists a family of possible correct strings for a single string to be corrected. For example, take a single symbol error in the sequence of Walking-to-Sitting transition represented as;

$$W\text{-}St\text{-}St\text{-}\$_{St,S}\text{-}St\text{-} \ldots \text{-}St\text{-}\$.,\text{-} \ldots \text{-}\$.,\text{-}S\text{-} \ldots$$

In the above, $\$_{St,S}$ represents a transition from standing to sitting position. Since $\$_{St,S}$ to St is not a valid transition, the symbol $\$_{St,S}$ may be replaced either by St or all subsequent symbols of St after the transition symbol may be replaced by the same transition symbol until the symbol S occurs. Therefore, the probable corrected version of the string representing Walking-to-Sitting may be given by, $$W\text{-}St\text{-}St\text{-}St\text{-}St\text{-} \ldots \text{-}St\text{-}\$.,\text{-} \ldots \text{-}\$.,\text{-}S \qquad \text{-(I)}$$

$$W\text{-}St\text{-}St\text{-}\$.,\text{-} \ldots \text{-}\$.,\text{-}S\text{-} \ldots \qquad \text{-(II)}$$

The error correction achieved in above relation (I) is referred to as forward error propagation and that achieved in relation (II) is referred to as backward error propagation.

Further, in an implementation, the activity determining module 124 can identify possible confusions and valid transitions of symbols in order to be able to achieve corrections. In an example, St has a considerable chance of getting confused with ε, ξ, or W. In order to determine the probable correct sequences, the activity determining module 124 can identify possible confusions and valid transitions of the symbols. The activity determining module 124 can consider the symbol set discussed above and can identify the confusions in determining the symbols to be used for error correction using pivot joint positions.

The activity determining module 124 can assume that there is a valid sequence of symbols for an activity preceding and succeeding the symbol or a pool of symbols to be corrected. Accordingly, in an implementation, the activity determining module 124 can identify the set of valid transitions based on uniform distribution analogous to a maximum entropy model. For example, for the set of valid transitions given by W→(W, St), St→(W, St, $, ..., ε), the probabilities of transitions are given by, $$p(W \to W) = 1/2 \ast (1/N), \text{ and}$$

$$p(W \to St) = 1/2 \ast (1/N)$$

The above relations depict that the probability of W transitioning to St and the probability of no transition is 50%.

As an example, consider activities, such as idle sitting, watching TV and reading newspaper which can be variants of the activity of sitting. In one case, the activity of watching TV and reading newspaper can be achieved by capturing the head-leaning. Similarly, activities of drinking water, taking medicines, and idle standing can be considered as variants of standing. In such a case, the activities of idle standing and drinking water can be differentiated based on backward leaning of head-joint. However, it may be difficult to distinguish between drinking water and taking medicine. In such a case, certain additional identification parameter can be used. For instance, in such a case, a timestamp associated with right hand joint or left hand joint of the subject, based on whether the subject is right handed or left handed, a synchronous movement of the hand joint with the head joint, and a correlation between head-leaning and hand-lifting movements. Say, a long timestamp will indicate drinking water. In one example, the identification can be detected based on skeletal-joints, say the head joint, shoulder centre joint, right shoulder joint, and left shoulder joint.

As would be understood, the activity determining module 124 pushes the identification parameter into the NPDA state machine for determining the activity as part of the dynamicity of determining the activity associated with dynamically identifying the actions, i.e., as the identified action changes dynamically, the possible options of the current activities also change. Accordingly, the activity determining module 124 can push the identification parameters associated with the current determined activity into the stack for facilitating in determining the current activity from the set of possible activities. Therefore, as is evident, the activity determining module 124 dynamically updates the state of the stack, based on the identified activity.

The above explained aspects of the present subject matter are further elaborated with the help of the following example. As will be appreciated, the examples are provided for illustration purposes and should not be construed as limiting.

In said example, that the activity determining module 124 implements the NPDA state machine by performing the a plurality of steps, not in any particular sequence, depicted by the following relations:

$$\delta(q0,\epsilon,(\epsilon,\epsilon)) = (q0,(\epsilon,\text{timestamp})). \qquad 1.$$

$$\delta(q0,W,(\epsilon,\epsilon)) = (q1,(\text{height},\text{timestamp})). \qquad 2.$$

$$\delta(q1,W,(\epsilon,\epsilon)) = (q1,(\text{height},\text{timestamp})). \qquad 3.$$

$$\delta(q1,St,(\epsilon,\epsilon)) = (q2,(\text{height},\text{timestamp})). \qquad 4.$$

$$\delta(q1,L,(\epsilon,\epsilon)) = (D,(\epsilon,\epsilon). \qquad 5.$$

$$\delta(D,\epsilon,(\text{height},\text{timestamp})) = (D,(\epsilon,\epsilon). \qquad 6.$$

$$\delta(q2,St,(\epsilon,\epsilon)) = (q2,(\text{height},\text{timestamp})). \qquad 7.$$

$$\delta(q2,\epsilon,(\epsilon,\epsilon)) = (q4,(\epsilon,\epsilon)) \qquad 8.$$

$$\delta(q2,\sigma,(\epsilon,\epsilon)) = (q3,(\text{height},\text{timestamp})). \qquad 9.$$

$$\delta(q2,W,(\epsilon,\epsilon)) = (q1,(\text{height},\text{timestamp})). \qquad 10.$$

$$\delta(q2,S,(\epsilon,\epsilon)) = (q7,(\text{height},\text{timestamp})). \qquad 11.$$

$$\delta(q2,L,(\epsilon,\epsilon)) = (D,(\epsilon,\epsilon). \qquad 12.$$

$$\delta(D,\epsilon,(\text{height},\text{timestamp})) = (D,(\epsilon,\epsilon). \qquad 13.$$

$$\delta(q3,\sigma,(\text{height},\text{timestamp})) = (q3,(\epsilon,\epsilon)). \qquad 14.$$

$$\delta(q3,\xi,(\epsilon,\epsilon)) = (q16,(\epsilon,\epsilon)). \qquad 15.$$

$$\delta(q16,L,(\epsilon,\epsilon)) = (\text{Caution},(\epsilon,\epsilon)). \qquad 16.$$

$$\delta(\text{Caution},\epsilon,(\text{height},\text{timestamp})) = (\text{Caution},(\epsilon,\epsilon)). \qquad 17.$$

$$\delta(q16,St,(\epsilon,\epsilon)) = (q16,(\text{height},\text{timestamp})). \qquad 18.$$

$$\delta(q7,S,(\epsilon,\epsilon)) = (q7,(\text{height},\text{timestamp})). \qquad 19.$$

$$\delta(q7,St,(\epsilon,\epsilon)) = (q2,(\text{height},\text{timestamp})). \qquad 20.$$

$\delta(q7,L,(\epsilon,\epsilon))=(q8,(\text{height,timestamp}))$.  21.

$\delta(q7,\epsilon,(\epsilon,\epsilon))=(q9,(\epsilon,\epsilon))$.  22.

$\delta(q8,L,(\epsilon,\epsilon))=(q8,(\text{height,timestamp}))$.  23.

$\delta(q8,S,(\epsilon,\epsilon))=(q7,(\text{height,timestamp}))$.  24.

$\delta(q4,St,(\epsilon,\epsilon))=(q12,(\text{Covariance,timestamp}))$.  25.

$\delta(q12,St,(\epsilon,\epsilon))=(q12,(\text{Covariance,timestamp}))$.  26.

$\delta(q12,W,(\text{Covariance,timestamp}))=(q13,(\epsilon,\epsilon))$.  27.

$\delta(q13,c,(\text{covariance,timestamp}))=(q13,(\epsilon,\epsilon))$.  28.

$\delta(q13,T,(\text{covariance},\epsilon))=(q5,(\epsilon,\epsilon))$  29.

$\delta(q13,F,(\text{covariance},\epsilon))=(q6,(\epsilon,\epsilon))$.  30.

$\delta(q5,c,(\epsilon,\epsilon))=(q1,(\text{height,timestamp}))$.  31.

$\delta(q6,\epsilon,(\epsilon,\epsilon))=(q1,(\text{height,timestamp}))$.  32.

$\delta(q9,S,(\epsilon,\epsilon))=(q14,(\text{Covariance,timestamp}))$  33.

$\delta(q9,W,(\epsilon,\epsilon))=(D,(\epsilon,\epsilon)$.  34.

$\delta(q9,St,(\epsilon,\epsilon))=(D,(\epsilon,\epsilon)$.  35.

$\delta(D,\epsilon,(\text{height,timestamp}))=(D,(\epsilon,\epsilon)$.  36.

$\delta(q14,S,(\epsilon,\epsilon))=(q14,(\text{Covariance,timestamp}))$.  37.

$\delta(q14,L,(\text{Covariance,timestamp}))=(q15,(\epsilon,\epsilon))$.  38.

$\delta(q15,\epsilon,(\text{covariance,timestamp}))=(q15,(\epsilon,\epsilon))$.  39.

$\delta(q15,T,(\text{covariance},\$))=(q10,(\epsilon,\epsilon))$.  40.

$\delta(q15,F,(\text{covariance},\$))=(q11,(\epsilon,\epsilon))$.  41.

$\delta(q10,c,(\epsilon,\epsilon))=(q8,(\text{height,timestamp}))$.  42.

$\delta(q11,\epsilon,(\epsilon,\epsilon))=(q8,(\text{height,timestamp}))$.  43.

In the above relations, S, L, St, σ, W, ξ, depict the actions standing, lying, sitting, disappearing, walking, and appearing, respectively, as described previously; $\epsilon$ depicts a null value or a non-deterministic transition, i.e., case in which the current activity cannot be determined, q0 depicts the activity corresponding to the initial state, q1 depicts the activity of going to the bathroom, q2 depicts the activity of idle standing, q3 depicts the activity of disappearance during bathroom activity, q4 depicts the activity of decision while standing, q5 depicts the activity of taking medicine, q6 depicts the activity of drinking water, q7 depicts the activity of idle sitting, q8 depicts the activity of in bed, q9 depicts the activity of decision while sitting, q10 depicts the activity of reading the newspaper, q11 depicts the activity of watching television, q2, q13, q14, q15, q16 depict intermediate activities, D depicts a dead state, i.e., a state in which the activity cannot be determined. The activities q0 to q16 and D form the set of activities Q. T and F stand for "True" and "False", respectively. T and F can depict the transitions that are not described in the grammar and can indicate false detection. For instance, the subject cannot walk immediately after laying, without transition through sitting.

Further, δ depicts the transition function indicative of a transition from one activity to another and the action rules. The transition function and δ can be defined as in the following relation, as an example:

δ: Q times Γ→ρ(Q) times Γ

In the above relation, Γ depicts a set of all stack symbols. For instance, Γ can be a set of the order (element, element) and the elements can be the stack symbols including Z-coordinate of head-joint, covariance of the head-joint, timestamp, or null ($\epsilon$). Further, as would be understood, the above notation of δ provides a manifestation of the context-free grammar in the present subject matter, as an example.

Referring to relation no. 1, when the activity determining module 124 determines the immediately preceding activity is q0 (initial state) and that the identified action in the stack is "null", and there is nothing in the stack (null, null), then the current activity is the same as the immediately preceding activity, i.e., q0. In addition, the activity q0 is determined to belong to the category of activities for which the identified actions do not suffice for identification, and therefore, the activity determining module 124 can push the timestamp into the stack.

The skeleton data processing module 118, the preparation module 120, the action determining module 122, the activity determining module 124, and other module(s) 126 are implemented as a logically self-contained part of a software program that when executed perform the above method described herein. In another embodiment, the skeleton data processing module 118, the preparation module 120, the action determining module 122, the activity determining module 124, and other module(s) 126 are implemented as a self-contained hardware component.

Figure 2A:
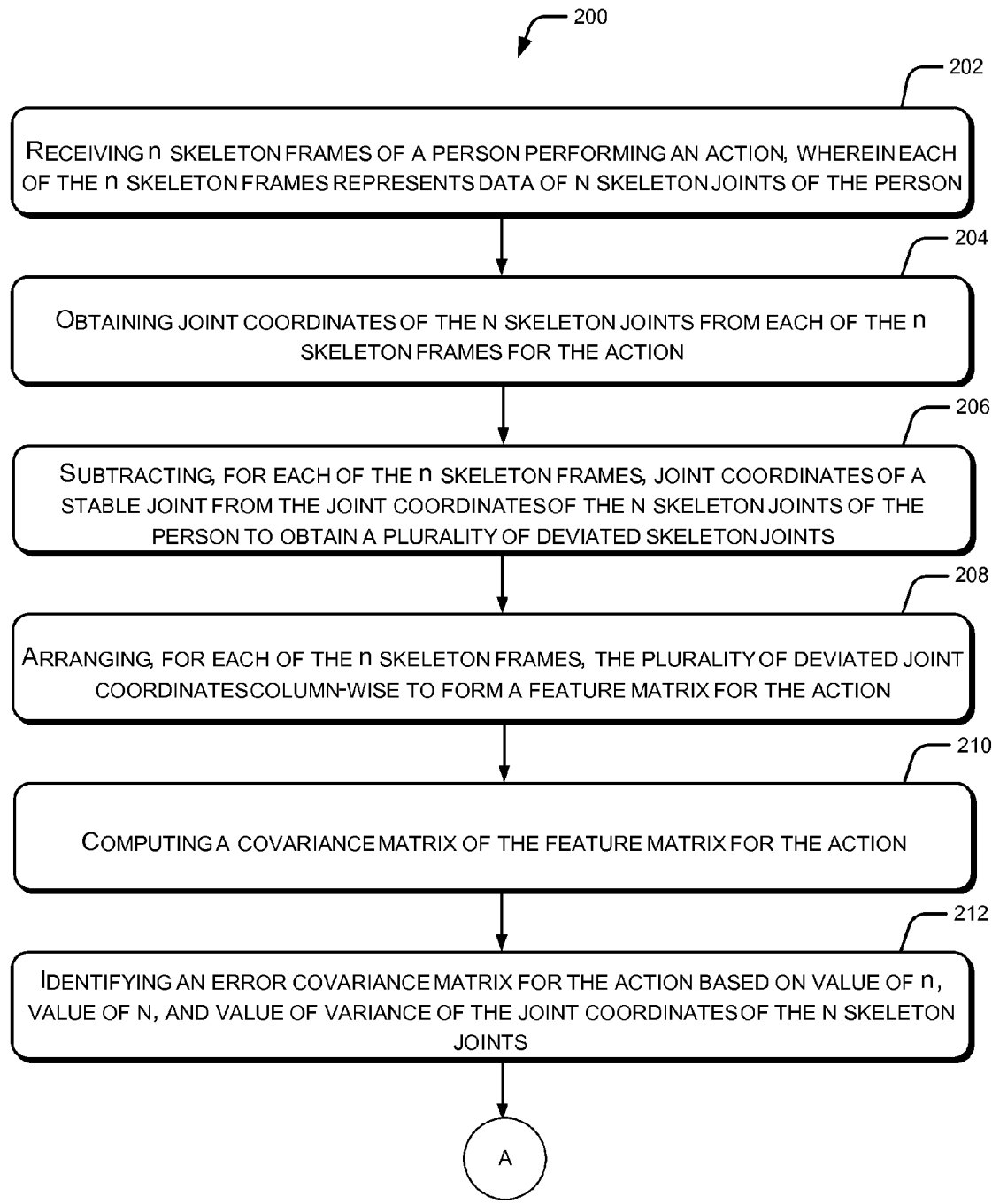
FIGS. 2a and 2b illustrate a method for identifying an action, from amongst a plurality of known actions, performed by a subject, according to an embodiment of the present subject matter.
Figure 2B:
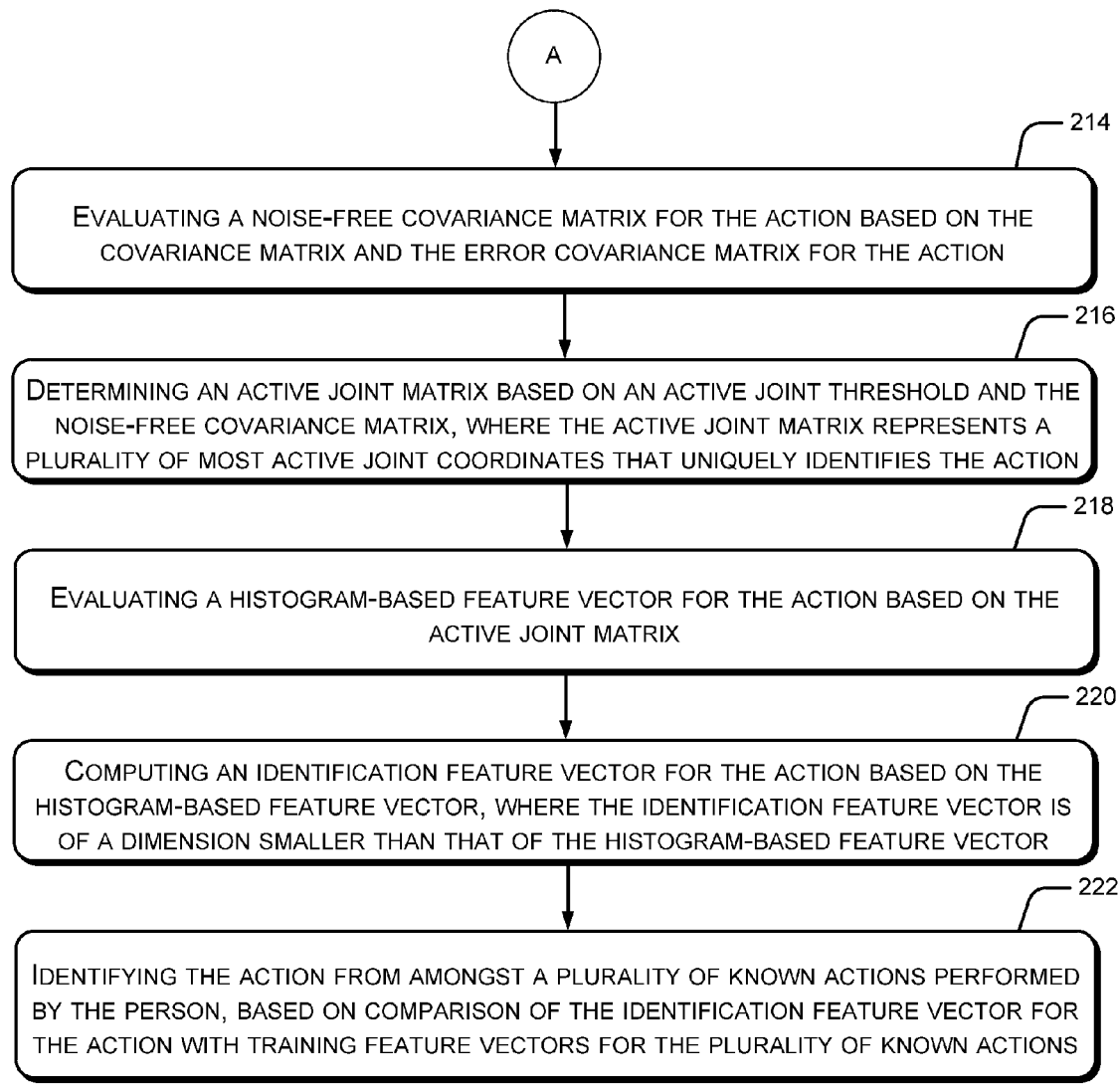

FIG. 2, with reference to FIG. 1, illustrates a method 200 for identifying an action, from amongst a plurality of known actions, performed by a subject, according to an embodiment of the present subject matter. The method 200 is implemented in a computing device, such as the identification system 102. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network.

The order in which the method is described is not intended to be construed as a limitation, and any number of the described method blocks can be combined in any order to implement the method, or an alternative method. Furthermore, the method can be implemented in any suitable hardware, software, firmware or combination thereof At block 202, the method 200 includes receiving n skeleton frames of the subject performing the action, wherein each of the n skeleton frames represents data of N skeleton joints of the subject. In one example, the n skeleton frames may be received from the skeleton recording device 106, for example, a Kinect® device. Further, examples of the N skeleton frames include a head joint, a shoulder centre joint, a shoulder left joint, a shoulder right joint, a spine joint, a hand left joint, and a hand right joint. In accordance with one implementation of the present subject matter, the skeleton data processing module 118 of the identification system 102 receives n skeleton frames of the subject performing the action.

At block 204, the method 200 includes obtaining joint coordinates of the N skeleton joints from each of the n skeleton frames for the action. In an example, x, y, and z Cartesian joint coordinates of each of the N skeleton joints are obtained from each skeleton frame. Thus, for N skeleton joints from each skeleton frame, 3N joint coordinates are determined. In one implementation, the skeleton data processing module 118 obtains joint coordinates of the N skeleton joints from each of the n skeleton frames.

At block 206, the method 200 includes subtracting, for each of the n skeleton frames, joint coordinates of a stable joint from the joint coordinates of the N skeleton joints of the subject to obtain a plurality of deviated skeleton joints. In one example, the stable skeleton joint may be a hip centre joint. In one example, 3(N−1) deviated joint coordinates, each deviated from the stable joint, are obtained.

At block 208, the method 200 includes arranging, for each of the n skeleton frames, the plurality of deviated joint coordinates column-wise to form a feature matrix for the action. In the feature matrix, the columns represent 3(N−1) deviated joint coordinates and rows represent skeleton frames. In one implementation, the action determining module 122 evaluates the feature matrix for the action of the subject as described earlier in the description.

At block 210, the method 200 includes computing a covariance matrix of the feature matrix for the action. The covariance matrix is computed by multiplying the feature matrix and its transpose. The covariance matrix includes an error component, which may be referred to as an error covariance matrix. In one implementation, the action determining module 122 computes the covariance matrix of the feature matrix for the action.

At block 212, the method 200 includes identifying the error covariance matrix for the action based on the value of n, the value of N, and the value of variance of the joint coordinates of one of the N skeleton joints. The error covariance matrix may relate to noise present in the joint coordinates of the N skeleton joints from the n skeleton frames of the subject. In one implementation, the action determining module 122 identifies the error covariance matrix for the action as described earlier in the description.

At block 214, the method 200 includes evaluating a noise-free covariance matrix for the action based on the covariance matrix and the error covariance matrix for the action. In an example, the error covariance matrix is subtracted from the covariance matrix to obtain the noise-free covariance matrix. In one implementation, the action determining module 122 evaluates the noise-free covariance as described earlier in the description.

At block 216, the method 200 includes determining an active joint matrix based on an active joint threshold and the noise-free covariance matrix, where the active joint matrix represents a plurality of most active joint coordinates that uniquely identifies the action. The active joint threshold is a value that enables in segregating the active joint matrix from the noise-free covariance matrix. In an example, the active joint threshold is determined based on Eigen values of the noise-free covariance matrix and the value of N. In one implementation, the action determining module 122 determines the active joint matrix as described earlier in the description.

At block 218, the method 200 includes evaluating a histogram-based feature vector for the action, based on the active joint matrix. The histogram-based feature vector represents a histogram of occurrences of the most active joint coordinates in the active joint matrix for the known action. In one implementation, the action determining module 122 determines the histogram-based feature vector based on the active joint matrix as described earlier in the description.

At block 220, the method 200 includes computing an identification feature vector for the action based on the histogram-based feature vector, where the identification feature vector is of a dimension smaller than that of the histogram-based feature vector. In an example, since most of the elements in the histogram-based feature vector are zero due to the sparse structure of active joint matrix, the histogram-based feature vector can be mapped to a lower-dimension vector, i.e., the identification feature vector. In one implementation, the action determining module 122 determines the identification feature vector from the histogram-based feature vector as described earlier in the description.

At block 222, the method 200 includes identifying the action, from amongst the plurality of known actions, performed by the subject, based on comparison of the identification feature vector for the action with training feature vectors for the plurality of known actions. In one example, the training feature vector for a known action is unique for the identification. In one implementation, the action determining module 122 identifies the action from amongst the plurality of known actions performed by the subject as described earlier in the description.

As described earlier, for the purpose of identification of the action being performed by the subject, the identification system 102 is trained initially over the plurality of known actions performed by one or more training subjects.

In an implementation, for training the identification system, n skeleton frames of a training subject are received for each of the plurality of known actions being performed by the training subject, where each of the n skeleton frames represents data of N skeleton joints of the training subject. Thereafter, joint coordinates of the N skeleton joints are obtained from each of the n skeleton frames for a respective known action. Subsequently, for each of the n skeleton frames, joint coordinates of a stable joint, such as a hip centre joint are subtracted from the joint coordinates of the N skeleton joints to obtain a plurality of deviated skeleton joints and then the plurality of deviated joint coordinates are arranged column-wise to form a feature matrix for the respective known action. Further, a covariance matrix of the feature matrix is computed for each of the plurality of known actions and an error covariance matrix is identified for each of the plurality of known actions based on value of n, value of N, and value of variance of the joint coordinates of one of the N skeleton joints. Furthermore, a noise-free covariance matrix is evaluated for each of the plurality of known actions based on the covariance matrix and the error covariance matrix for the respective known action. Once the noise-free covariance matrix is evaluated, an active joint matrix is determined for each of the plurality of known actions based on an active joint threshold and the noise-free covariance matrix for each of the plurality of known actions, where the active joint matrix represents a plurality of most active joint coordinates that uniquely identifies a known action. Thereafter, a histogram-based feature vector is computed for each of the plurality of known actions based on the active joint matrix for the respective known action, where the histogram-based feature vector represents a histogram of occurrences of the plurality of most active joint coordinates in the active joint matrix for the respective known action. Further, a training feature vector is determined for each of the plurality of known actions based on the histogram-based feature vector for each of the plurality of known actions. Although, it has been described that the training feature vector is determined for each of the plurality of known actions performed for one time, the training feature vectors can be determined for each of the plurality of known actions performed for r times. With this, r training feature vectors are determined for each known action. The training feature vectors for all the known actions performed r times are populated in a dataset and the identification system 102 is trained for the dataset using a classifier. In one example, the classifier may be a Support Vector Machine (SVM) classifier.

Although embodiments for methods and systems for identifying an action, from amongst a plurality of known actions, performed by a subject have been described in a language specific to structural features and/or methods, it is to be understood that the present subject matter is not necessarily limited to the specific features or methods described. Rather, the specific features and methods are disclosed as exemplary embodiments for identifying an action, from amongst a plurality of known actions, performed by a subject.

Figure 3:
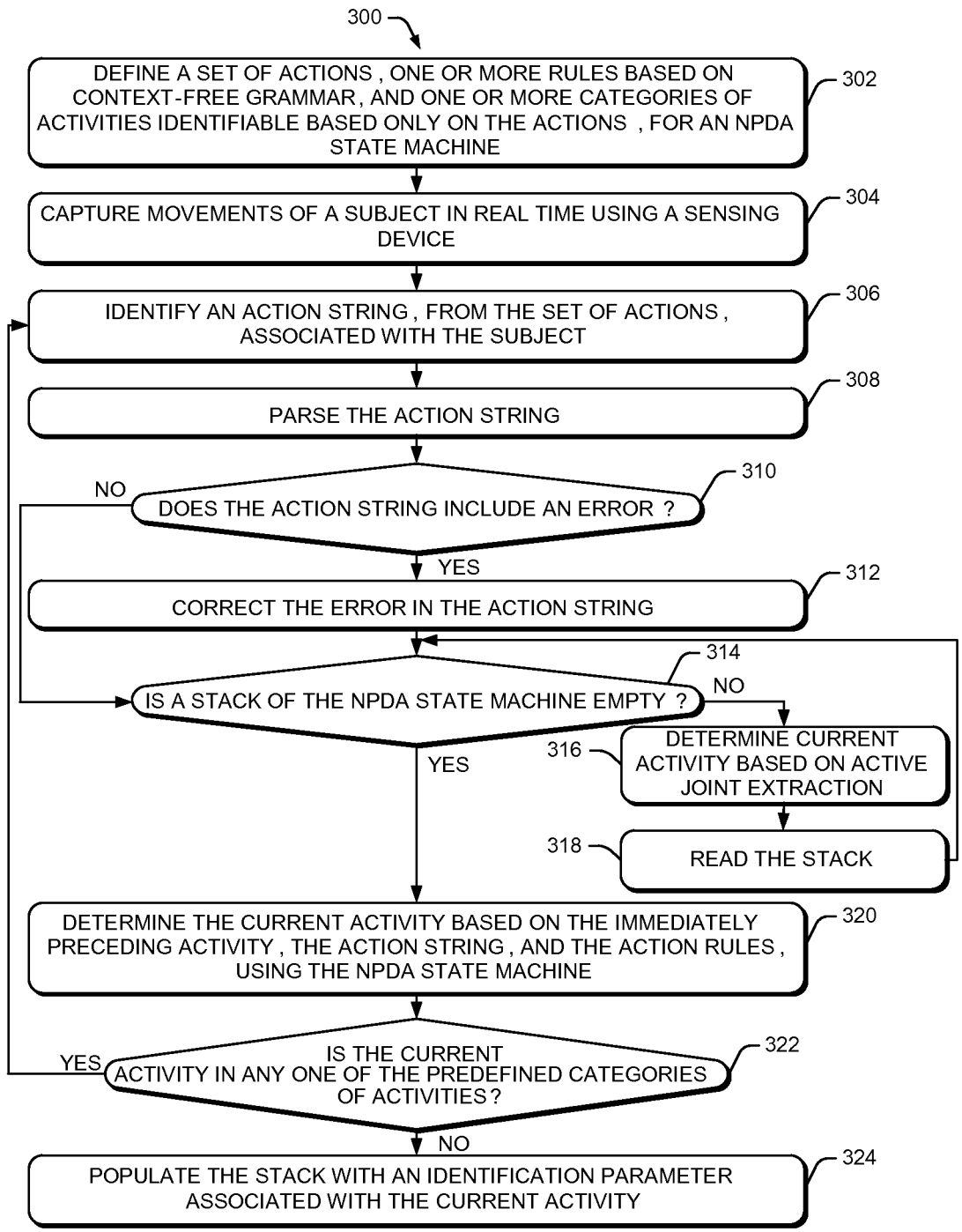
FIG. 3 illustrates a method for identification of an activity performed by a subject based on sensor data analysis, according to an embodiment of the present subject matter.

FIG. 3, with reference to FIGS. 1 and 2, illustrates a method 300 for identification of an activity performed by a subject based on sensor data analysis, according to an embodiment of the present subject matter. The order in which the method is described is not intended to be construed as a limitation, and any number of the described method blocks can be combined in any order to implement the method or any alternative method. Additionally, individual blocks may be deleted from the method without departing from the spirit and scope of the subject matter described herein. Furthermore, the method can be implemented in any suitable hardware, software, firmware, or combination thereof The method 300 may be described in the general context of computer executable instructions. Generally, the computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, the computer executable instructions may be located in both local and remote computer storage media, including memory storage devices.

In an implementation, one or more of the methods described herein may be implemented at least in part as instructions embodied in a non-transitory computer-readable medium and executable by one or more computing devices. In general, a processor, for example, a microprocessor, receives instructions, from a non-transitory computer-readable medium, for example, a memory, and executes those instructions, thereby performing one or more methods, including one or more of the methods described herein. Such instructions may be stored and/or transmitted using any of a variety of known computer-readable media.

With reference to the description of FIG. 3, for the sake of brevity, the details of the components of the identification system 102 are not discussed here. Such details can be understood as provided in the description provided with reference to FIG. 1.

Referring to FIG. 3, block 302 illustrates the preparation stage in which the identification system 102 is prepared for determining the activity of the subject based on the at least one identified action. Accordingly, at block 302, a set of actions which when temporally organized constitute the activity, one or more predefined action rules based on context-free grammar, and one or more categories of activities indicative of activities identifiable based on identified action alone, are defined and stored. In one case, the set of actions can include actions, such as walking (W), sitting (S), standing (St), lying (L), appearing ($\xi$), and disappearing ($\sigma$). Accordingly, the activities can be, for example, going to bathroom, reading newspaper, drinking water, and coming from bathroom.

At block 304, movements of the subject are captured in real-time using the sensing device 126 and provided to the identification system 102. In an example, the sensing device 106 can be a Kinect® device, a camera, a depth sensor, a red-green-blue (RGB) colour sensor, or a mobility sensor. At block 306, an action string associated with the subject is identified from among the actions in the set of actions, based on captured movements. The action string can be understood as a string formed of temporally organized action instances.

Subsequently, the present subject matter implements the NPDA state machine and determines the current activity. In an example, the NPDA state machine is implemented by the activity determining module 124. Accordingly, at block 308, the action string associated with the at least one identified action is parsed. In an example, the activity determining module 124 can parse the action string to determine the action instances in the action string. In an example, the parsing of the action string is done based on the context-free grammar. In other words, the action instances in the action strings are identified based on the context-free grammar. For instance, the action determining module 122 can parse the action string. According to an aspect, the context-free grammar infers the state transitions of the activities, i.e., based on the context-free grammar, the system 102 can determine whether there has been a change in the activity being performed by the subject. In an example, the based on the context-free grammar, the stack of the NPDA state machine may be popped or pushed, i.e., emptied for reading or populated.

At block 310, it is determined whether the action string parsed at block 308 includes an error or not. In an example, the activity determining module 124 can determine whether the action string has an error or not based on the predefined sequence of actions provided as part of the action rules.

If it is determined that the action string includes an error ('Yes' path from block 210), then at block 312, the error in the action string is corrected. In an implementation, the activity determining module 124 can correct the error based on a maximum entropy model. Subsequently, the activity is determined at block 314.

However, if it is determined that the action string does not include an error ('No' path from block 210), then the identification of the activity is carried out at block 314. Accordingly, at block 314, it is determined whether a stack of the NPDA state machine is empty or not. This step is done to determine if there is any information in the stack which is to be taken into account to make a conclusive decision regarding the current activity of the subject. In an example, the activity data 132 is implemented as the stack of the NPDA state machine.

If, at block 314, it is determined that the stack is not empty ('No' path from block 214), then at block 316, the activity is determined based on active joint extraction. In such a case, the activity determining module 124 can determine the movement of the joints of the subject in relation to the pivot joint and determine the actions and the associated activities. Subsequently, at block 318, the stack of the NPDA machine can be read, say by popping-up the stack, to determine whether the stack is empty or not.

However, if at block 314, it is determined that the stack is empty ('Yes' path from block 214), then at block 320, the current activity is determined based on the immediately preceding activity, the action rules and the action string associated with the at least one identified action, using the NPDA machine. In an example, the current activity is determined with reference to even that sequence of actions in the set of actions in which the action string is a coefficient, i.e., even when the action string only matches a portion of the sequence of actions.

Further, at block 322, it is determined as to whether the current activity falls within a category defined in block 302 where the activity can be identified on the basis of the identified action alone and any other information is not used for determining the activity. If, at block 322, it is determined that the current activity belongs to such a category ('Yes' path from block 322), then the method repeats from block 306. However, if at block 322, it is determined that the current activity does not belongs to such a category ('No' path from block 322), then at block 324, the identification parameter associated with the current activity is populated in or pushed down the stack of the NPDA state machine. In an example, the identification parameter can include a timestamp associated with the current activity, a height of the subject, a covariance associated with a skeletal joint of the subject, and an empty state of the stack. Subsequently, another action string is identified at block 306 and the analyzed in the manner mentioned above. Therefore, as will be understood, the current activity can be continuously determined as and when the actions or action strings are identified.

Although implementations for methods and systems for identification of an activity performed by a subject based on sensor data analysis are described, it is to be understood that the present subject matter is not necessarily limited to the specific features or methods described. Rather, the specific features and methods are disclosed as implementations for identification of an activity performed by a subject based on sensor data analysis.

What is claimed is:

1. A method for identification of an activity performed by a subject, the method comprising:
    capturing movements of the subject in real-time using a sensing device, wherein the movements comprises n skeleton frames of the subject, and wherein each of the n skeleton frames represents data of N skeleton joints of the subject;
    ascertaining, by a processor, at least one action associated with the subject from a predefined set of actions, a plurality of actions from the predefined set of actions collectively forming at least one activity, wherein the ascertaining is based on captured movements of the subject and at least one predefined action rule, the at least one predefined action rule being based on context-free grammar (CFG) and being indicative of a sequence of actions for occurrence of the at least one activity;
    determining, dynamically, by the processor, a current activity performed by the subject, based on the at least one action and an immediately preceding activity, using a non-deterministic push-down automata (NPDA) state machine, and
    wherein ascertaining, by the processor, the at least one action comprises:
    computing, by the processor, a covariance matrix of a feature matrix for the at least one action, wherein the feature matrix is based on joint coordinates of the N skeleton joints from each of the n skeleton frames for the action;
    identifying, by the processor, an error covariance matrix for the at least one action based on value of n, value of N, and value of variance of the joint coordinates of one of the N skeleton joints, wherein the error covariance matrix relates to noise present in the joint coordinates of the N skeleton joints of the subject;
    evaluating, by the processor, a noise-free covariance matrix for the at least one action based on the covariance matrix and the error covariance matrix;
    determining, by the processor, an active joint matrix for the at least one action based on an active joint threshold and the noise-free covariance matrix, wherein the active joint matrix represents a plurality of most active joint coordinates that uniquely identifies the at least one action; and
    identifying, by the processor, the at least one action, from amongst the plurality of known actions, based on the active joint matrix.

2. The method as claimed in claim 1, wherein the determining the current activity is based on a state of a stack of the NPDA state machine, and wherein the determining the current activity comprises ascertaining whether the current activity is different from the immediately preceding activity, based on the state of the stack of the NPDA state machine.

3. The method as claimed in claim 1 further comprising obtaining at least one predefined category of activities indicative of activities identifiable based on the at least one action alone.

4. The method as claimed in claim 3 further comprising:
    ascertaining, by the processor, whether the current activity falls within the at least one category of activities; and
    providing, by the processor, an identification parameter associated with the current activity to the NPDA state machine for populating a stack of the NPDA state machine, based on the ascertaining,
    wherein the identification parameter comprises at least one of a timestamp associated with the current activity, a height of the subject, a covariance associated with a skeletal joint of the subject, and an empty state of the stack, and
    wherein the current activity comprises a non-deterministic state indicative of a non-identifiable activity.

5. The method as claimed in claim 1, wherein the predefined set of actions comprises walking, sitting, standing, laying, appearing, and disappearing, and wherein the predefined action rule comprises at least one sequence of a plurality of actions from the predefined set of actions.

6. The method as claimed in claim 1, further comprising:
    evaluating a histogram-based feature vector for the at least one action based on the active joint matrix, wherein the histogram-based feature vector represents a histogram of occurrences of the plurality of most active joint coordinates in the active joint matrix for the at least one action;
    computing an identification feature vector that uniquely identifies the at least one action, wherein the identification feature vector is of a dimension smaller than that of the histogram-based feature vector for the at least one action and is computed based on a pre-defined dimension reduction technique performed on the histogram-based feature vector for the at least one action; and
    wherein the at least one action, from amongst the plurality of known actions, performed by the subject, is identified based on comparison of the identification feature vector with training feature vectors for the plurality of known actions, and wherein a training feature vector for a known action uniquely identifies the known action.

7. The method as claimed in claim 1, further comprising:
obtaining the joint coordinates of the N skeleton joints from each of the n skeleton frames for the at least one action;
subtracting, for each of the n skeleton frames, joint coordinates of a stable joint from the joint coordinates of the N skeleton joints of the subject to obtain a plurality of deviated skeleton joints; and
evaluating the feature matrix for the action based on arranging, for each of the n skeleton frames, the plurality of deviated joint coordinates column-wise.

8. The method as claimed in claim 1, wherein the identifying the error covariance matrix for the action comprises:
determining elements of the error covariance matrix based on:

$$T'(i, j) = n\left(\frac{6N - S}{3(N - 1)}\right)\sigma^2, \text{ for } i = j,$$

$$T'(i, j) = n\left(\frac{3N - 2}{3(N - 1)}\right)\sigma^2, \text{ for } i \neq j \text{ and } (i \bmod 3) = (j \bmod 3); \text{ and}$$

$$T'(i, j) = \frac{n\sigma^2}{2(N - 1)}, \text{ for } i \neq j \text{ and } (i \bmod 3) \neq (j \bmod 3),$$

wherein T'(i,j) represents an $(i,j)^{th}$ element of the error covariance matrix for the action, and wherein $\sigma^2$ represents the value of variance of the joint coordinates of one of the N skeleton joints of the subject.

9. The method as claimed in claim 1, wherein the N skeleton joints of the subject comprises a head joint, a shoulder centre joint, a shoulder left joint, a shoulder right joint, a spine joint, a hand left joint, a hand right joint, an elbow right joint, an elbow left joint, a wrist right joint, a wrist left joint, a hip left joint, a hip right joint, a hip centre joint, a knee right joint, a knee left joint, a foot left joint, a foot right joint, an ankle right joint, and an ankle left joint.

10. The method as claimed in claim 1, further comprising:
receiving n skeleton frames of a training subject for each of the plurality of known actions being performed by the training subject, wherein the n skeleton frames are received from the sensing device (104), and wherein each of the n skeleton frames represents data of N skeleton joints of the training subject;
obtaining joint coordinates of the N skeleton joints from each of the n skeleton frames for a respective known action;
subtracting, for each of the n skeleton frames, joint coordinates of a stable joint from the joint coordinates of the N skeleton joints to obtain a plurality of deviated skeleton joints;
arranging, for each of the n skeleton frames, the plurality of deviated joint coordinates column-wise to form a feature matrix for the respective known action;
computing a covariance matrix of the feature matrix for each of the plurality of known actions;
identifying an error covariance matrix for each of the plurality of known actions based on value of n, value of N, and value of variance of the joint coordinates of one of the N skeleton joints, wherein the error covariance matrix relates to noise present in the joint coordinates of the N skeleton joints;
evaluating a noise-free covariance matrix for each of the plurality of known actions based on the covariance matrix and the error covariance matrix for the respective known action;
determining an active joint matrix for each of the plurality of known actions based on an active joint threshold and the noise-free covariance matrix for each of the plurality of known actions, wherein the active joint matrix represents a plurality of most active joint coordinates that uniquely identifies a known action;
computing a histogram-based feature vector for each of the plurality of known actions based on the active joint matrix for the respective known action, wherein the histogram-based feature vector represents a histogram of occurrences of the plurality of most active joint coordinates in the active joint matrix for the respective known action;
determining, for each of the plurality of known actions, a training feature vector that uniquely identifies the respective known action, wherein the training feature vector is of a dimension smaller than that of the histogram-based feature for the respective known action and is determined based on a pre-defined dimension reduction technique performed on the histogram-based feature vector for the respective known action; and
training an identification system using the training feature vector for each of the plurality of known actions to identify the action, from amongst the plurality of known actions, performed by the subject.

11. The method as claimed in claim 10, wherein the method further comprising:
receiving n skeleton frames of the training subject for each of the plurality of known actions being performed by the training subject for multiple times;
determining the training feature vector for each of the plurality of known actions performed for each of the multiple times; and
training the identification system using the training feature vector for each of the plurality of known actions performed for the multiple times.

12. An identification system for identifying an activity performed by a subject, the identification system comprising:
a processor;
an action identification module coupled to the processor to,
obtain captured movements of the subject in real-time using a sensing device; and
ascertain at least one action associated with the subject from a predefined set of actions, wherein a plurality of actions from the predefined set of actions collectively form at least one activity, the ascertaining being based on captured movements of the subject and at least one predefined action rule, the at least one predefined action rule being based on context-free grammar (CFG) and being indicative of a sequence of actions for occurrence of the at least one activity;
an activity determining module coupled to the processor to determine, dynamically, a current activity performed by the subject, based on the at least one action and an immediately preceding activity, using a non-deterministic push-down automata (NPDA) state machine; and
wherein the action identification module is further configured to, compute a covariance matrix of a feature matrix for the at least one action,
wherein the feature matrix is based on joint coordinates of N skeleton joints from each of n skeleton frames for the action;
identify an error covariance matrix for the action based on value of n, value of N, and value of variance of the joint coordinates of one of the N skeleton joints, wherein the error covariance matrix represents noise present in the joint coordinates of the N skeleton joints;
evaluate a noise-free covariance matrix for the at least one action based on the covariance matrix and the error covariance matrix for the action;
determine an active joint matrix for the at least one action based on an active joint threshold and the noise-free covariance matrix for the at least one action, wherein the active joint matrix represents a plurality of most active joint coordinates that uniquely identifies the at least one action; and
identify the at least one action, from amongst the plurality of known actions, performed by the person based on the active joint matrix for the action.

13. The identification system as claimed in claim 12 further comprising
a skeleton data processing module coupled to, and executable by, the processor to,
receive n skeleton frames of the person performing the at least one action, wherein the n skeleton frames are received from a skeleton recording device, and wherein each of the n skeleton frames represents data of N skeleton joints of the person;
a preparation module coupled to the processor to,
  a. obtain the predefined set of actions, wherein the predefined set of actions comprises walking, sitting, standing, laying, appearing, and disappearing; and
  b. obtain the at least one predefined action rule, wherein the predefined action rule comprises at least one sequence of a plurality of actions from the set of actions,
wherein the preparation module obtains at least one category of activities indicative of activities identifiable based on the at least one action alone, and
wherein the action identification module is further configured to.

14. The identification system as claimed in claim 12, wherein the activity determining module:
ascertains whether the current activity falls within the at least one category of activities;
pushes an identification parameter associated with the current activity into a stack of the NPDA state machine, based on the ascertaining,
determines the current activity based on a state of a stack of the NPDA state machine,
determines whether the current activity is different from the immediately preceding activity, based on the state of the stack of the NPDA state machine,
based on the state of the stack, determines the current activity based on active joint extraction of the subject, and
determines whether the current activity is a non-identifiable activity in response to a non-deterministic state determined during determination of the current activity.

15. The identification system as claimed in claim 13, wherein the action identification module further:

subtracts, for each of the n skeleton frames, joint coordinates of a stable joint from the joint coordinates of the N skeleton joints to obtain a plurality of deviated skeleton joints; and
evaluates the feature matrix for the action based on arranging, for each of the n skeleton frames, the plurality of deviated joint coordinates column-wise.

16. The identification system as claimed in claim 15, wherein the action identification module further:
determines a histogram-based feature vector for the action based on the active joint matrix, wherein the histogram-based feature vector represents a histogram of occurrences of the plurality of most active joint coordinates in the active joint matrix for the action; and
computes an identification feature vector that uniquely identifies the action, wherein the identification feature vector is of a dimension smaller than that of the histogram-based feature vector for the action and is computed based on a pre-defined dimension reduction technique performed on the histogram-based feature vector for the action, and
wherein the action, from amongst the plurality of known actions, performed by the subject, is identified based on comparison of the identification feature vector for the action with training feature vectors for the plurality of known actions, and wherein a training feature vector for a known action uniquely identifies the known action.

17. The identification system as claimed in claim 16, wherein the action identification module further:
evaluates a feature matrix for each of the plurality of known actions being performed by a training subject, wherein the feature matrix is evaluated based on joint coordinates of N skeleton joints from each of n skeleton frames of the training subject;
computes a covariance matrix of the feature matrix for each of the plurality of known actions;
identifies an error covariance matrix for each of the plurality of known actions based on value of n, value of N, and value of variance of the joint coordinates of one of the N skeleton joints, wherein the error covariance matrix relates to noise present in the joint coordinates of the N skeleton joints;
evaluates a noise-free covariance matrix for each of the plurality of known actions based on the covariance matrix and the error covariance matrix for the respective known action;
determines an active joint matrix for each of the plurality of known actions based on an active joint threshold and the noise-free covariance matrix for each of the plurality of known actions, wherein the active joint matrix represents a plurality of most active joint coordinates that uniquely identifies a known action;
computes a histogram-based feature vector for each of the plurality of known actions based on the active joint matrix for the respective known action, wherein the histogram-based feature vector represents a histogram of occurrences of the plurality of most active joint coordinates in the active joint matrix for the respective known action;
determines, for each of the plurality of known actions, a training feature vector that uniquely identifies the respective known action, wherein the training feature vector is of a dimension smaller than that of the histogram-based feature for the respective known action and is determined based on a pre-defined dimension reduction technique performed on the histogram-based feature vector for the respective known action; and training the identification system using the training feature vector for each of the plurality of known actions to identify the action, from amongst the plurality of known actions, performed by the subject.

18. A non-transitory computer-readable medium having embodied thereon a computer program for executing a method for identification of an activity performed by a subject based on sensor data analysis, the method comprising:

obtaining a set of actions, a plurality of actions from the set of actions collectively forming at least one activity;

obtaining at least one action rule, wherein the at least one action rule is based on context-free grammar (CFG), the action rule being indicative of a sequence of actions for occurrence of the at least one activity;

ascertaining at least one action associated with the subject from the set of actions, based on movements of the subject captured in real-time using a sensing device;

determining a current activity performed by the subject, using a non-deterministic push-down automata (NPDA) state machine, based on the at least one action, an immediately preceding activity, and a state of a stack of the NPDA state machine; and wherein ascertaining the at least one action comprises:

receiving n skeleton frames of the subject performing the action, wherein the n skeleton frames are received from the sensing device, and wherein each of the n skeleton frames represents data of N skeleton joints of the subject;

computing a covariance matrix of a feature matrix for the action, wherein the feature matrix is based on joint coordinates of the N skeleton joints from each of the n skeleton frames for the action;

identifying, by the processor, an error covariance matrix for the action based on value of n, value of N, and value of variance of the joint coordinates of one of the N skeleton joints, wherein the error covariance matrix relates to noise present in the joint coordinates of the N skeleton joints of the subject;

evaluating, by the processor, a noise-free covariance matrix for the action based on the covariance matrix and the error covariance matrix for the action;

determining, by the processor, an active joint matrix for the action based on an active joint threshold and the noise-free covariance matrix for the action, wherein the active joint matrix represents a plurality of most active joint coordinates that uniquely identifies the action; and identifying, by the processor, the at least one action, from amongst the plurality of known actions, based on the active joint matrix.

* * * * *